(12) United States Patent
Boettcher et al.

(10) Patent No.: US 10,001,994 B2
(45) Date of Patent: Jun. 19, 2018

(54) DATA PROCESSING APPARATUS AND METHOD FOR PERFORMING SCAN OPERATIONS OMITTING A FURTHER STEP

(71) Applicant: ARM LIMITED, Cambridge (GB)

(72) Inventors: Matthias Boettcher, Cambridge (GB); Giacomo Gabrielli, Cambridge (GB); Mbou Eyole-Monono, Cambridge (GB)

(73) Assignee: ARM Limited, Cambridge (GB)

( * ) Notice: Subject to any disclaimer, the term of this patent is extended or adjusted under 35 U.S.C. 154(b) by 531 days.

(21) Appl. No.: 14/601,431

(22) Filed: Jan. 21, 2015

(65) Prior Publication Data

US 2015/0254076 A1    Sep. 10, 2015

(30) Foreign Application Priority Data

Mar. 6, 2014    (GB) .................................. 1403955.6

(51) Int. Cl.
   *G06F 9/30*    (2018.01)
(52) U.S. Cl.
   CPC ........ *G06F 9/30036* (2013.01); *G06F 9/3001* (2013.01); *G06F 9/30098* (2013.01)
(58) Field of Classification Search
   CPC .................................................. G06F 9/30036
   See application file for complete search history.

(56) References Cited

U.S. PATENT DOCUMENTS

| 5,477,480 A | 12/1995 | Inui | |
| 6,539,413 B1 * | 3/2003 | Goldovsky | G06F 7/506 |
| | | | 708/700 |
| 7,725,518 B1 * | 5/2010 | Le Grand | G06F 7/506 |
| | | | 707/791 |
| 2007/0260663 A1 | 11/2007 | Frigo et al. | |
| 2009/0077345 A1 * | 3/2009 | Moyer | G06F 9/3001 |
| | | | 712/4 |
| 2010/0049950 A1 * | 2/2010 | Gonion | G06F 8/4441 |
| | | | 712/222 |
| 2010/0205585 A1 * | 8/2010 | McAllister | G06F 8/445 |
| | | | 717/140 |

OTHER PUBLICATIONS

Search Report for GB1403955.6, dated Aug. 20, 2014, three (3) pages.

* cited by examiner

*Primary Examiner* — Keith E Vicary
*Assistant Examiner* — William V Nguyen
(74) *Attorney, Agent, or Firm* — Nixon & Vanderhye P.C.

(57) ABSTRACT

A vector scan operation is performed to generate M data elements of a result vector, where each result data element corresponds to a combination of an additional data element S with at least some of the data elements of a source vector operand V. The vector scan operation is performed using a plurality of steps, each step comprising one or more combination operations for combining data elements. At least one of the steps includes two or more combination operations performed in parallel. At least two of the steps comprise a combination operation for combining a data element with the additional data element S. This approach enables the vector scan operation to be performed in fewer steps in the case where fewer than M data elements are active, so that the vector scan operation can be performed more quickly.

24 Claims, 15 Drawing Sheets

| clock cycle | 0 | 1 | 2 | 3 | 4 | 5 | 6 | 7 | 8 | 9 | 10 | 11 |
|---|---|---|---|---|---|---|---|---|---|---|---|---|
| scan 0 | 130 | | 131 | | 132 | | 133 | | 134 | | 135 | |
| scan 1 | | 130 | | 131 | | 132 | | 133 | | 134 | | 135 | pipeline utilisation (fig. 11)

| clock cycle | 0 | 1 | 2 | 3 | 4 | 5 | 6 | 7 |
|---|---|---|---|---|---|---|---|---|
| scan 0 | 130 | 126 | 131 | 127 | 132 | | 128 | |
| scan 1 | | 130 | 126 | 131 | 127 | 132 | | 128 | pipeline utilisation (fig. 12)

DATA PROCESSING APPARATUS AND METHOD FOR PERFORMING SCAN OPERATIONS OMITTING A FURTHER STEP

This application claims priority to GB Application No. 1403955.6 filed 6 Mar. 2014, the entire content of which is hereby incorporated by reference.

TECHNICAL FIELD

The present technique relates to the field of data processing. More particularly, it relates to a data processing apparatus and method for performing a vector scan operation.

TECHNICAL BACKGROUND

One known technique for improving performance of a data processing apparatus is to provide circuitry to support execution of vector operations. Vector operations are performed on at least one vector operand, where each vector operand comprises a plurality of vector elements. Performance of the vector operation then involves applying an operation repetitively across the various vector elements within the vector operand(s). In typical data processing systems that support performance of vector operations, a vector register file is be provided for storing the vector operands. Through the use of vector operations, significant performance benefits can be realised when compared with the performance of an equivalent series of scalar operations.

One known type of vector operation is a vector scan operation, where a predetermined combination operation is applied repetitively to an increasing number of data elements. The combination operation can take a variety of forms, such as an add operation, multiply operation, minimum selection operation, maximum selection operation, etc. As a result of performance of the vector scan operation, a sequence of results is generated, with each result relating to the application of the combination operation to a different number of the data elements. As a particular example, the scan operation may specify an add operation as the combination operation, and such a scan add operation is sometime referred to as a prefix sum operation. Considering an input sequence of numbers $x_0, x_1, x_2, \ldots$ application of the scan add operation produces a sequence of results $y_0, y_1, y_2, \ldots$, where:

$$y_0 = x_0 \quad y_1 = x_0 + x_1 \quad y_2 = x_0 + x_1 + x_2,$$

and so on for further results.

In some examples of the vector scan operation, an additional data element S may be combined with the vector data element V of the source vector, to produce a series of results (in the case of a scan add operation):

$$y_0 = S + x_0 \quad y_1 = S + x_0 + x_1 \quad y_2 = S + x_0 + x_1 + x_1,$$

and so on for further results.

The present technique seeks to provide an improved apparatus and method for carrying out such a vector scan operation.

SUMMARY

A data processing apparatus comprises:
a vector register store configured to store vector operands comprising a plurality of data elements;
processing circuitry configured to process vector operands from the vector register store; and
control circuitry configured to control the processing circuitry to perform a vector scan operation on M data elements of a source vector operand V[0] to V[M−1] and at least one additional data element S, to generate M data elements of a result vector operand R[0] to R[M−1], where for N≤M and 0≤i<N, data element R[i] of the result vector operand has a value corresponding to a combination of the at least one additional data element S and at least some of data elements V[0] to V[i] of the source vector operand;
wherein the control circuitry is configured to control the processing circuitry to perform the vector scan operation in a plurality of steps, each step for generating a second vector from a first vector, where the first vector for a first step comprises data elements of the source vector operand, and the first vector for other steps comprises the second vector of the preceding step, each step comprising at least one combination operation for combining a data element of the first vector with the at least one additional data element S or another data element of the first vector to generate a data element of the second vector;
at least one of said plurality of steps comprises a plurality of combination operations performed in parallel; and
at least two of said plurality of steps comprise a combination operation for combining a data element of the first vector with the at least one additional data element S.

A data processing apparatus comprises:
a vector register storage means for storing vector operands comprising a plurality of data elements;
processing means for processing vector operands from the vector register storage means; and
control means for controlling the processing circuitry to perform a vector scan operation on M data elements of a source vector operand V[0] to V[M−1] and at least one additional data element S, to generate M data elements of a result vector operand R[0] to R[M−1], where for N≤M and 0≤i<N, data element R[i] of the result vector operand has a value corresponding to a combination of the at least one additional data element S and at least some of data elements V[0] to V[i] of the source vector operand;
wherein the control means is configured to control the processing means to perform the vector scan operation in a plurality of steps, each step for generating a second vector from a first vector, where the first vector for a first step comprises data elements of the source vector operand, and the first vector for other steps comprises the second vector of the preceding step, each step comprising at least one combination operation for combining a data element of the first vector with the at least one additional data element S or another data element of the first vector to generate a data element of the second vector;
at least one of said plurality of steps comprises a plurality of combination operations performed in parallel; and
at least two of said plurality of steps comprise a combination operation for combining a data element of the first vector with the at least one additional data element S.

A data processing method is provided for performing a vector scan operation on M data elements of a source vector operand V[0] to V[M−1] and at least one additional data element S, to generate M data elements of a result vector operand R[0] to R[M−1], where for N≤—M and 0≤i<N, data element R[i] of the result vector operand has a value corresponding to a combination of the at least one additional data element S and at least some of data elements V[0] to V[i] of the source vector operand; the method performed using processing circuitry and comprising:
performing a plurality of steps for generating a second vector from a first vector, where the first vector for a first step comprises data elements of the source vector operand, and the first vector for other steps comprises the second vector of the preceding step, each step comprising at least one combination operation for combining a data element of the first vector with the at least one additional data element S or another data element of the first vector to generate a data element of the second vector;

wherein at least one of said plurality of steps comprises a plurality of combination operations performed in parallel; and at least two of said plurality of steps comprise a combination operation for combining a data element of the first vector with the at least one additional data element S.

Further aspects, features and advantages of the present technique will be apparent from the following description of examples, which is to be read in conjunction with the accompanying drawings.

DESCRIPTION OF EXAMPLES

Figure 1:
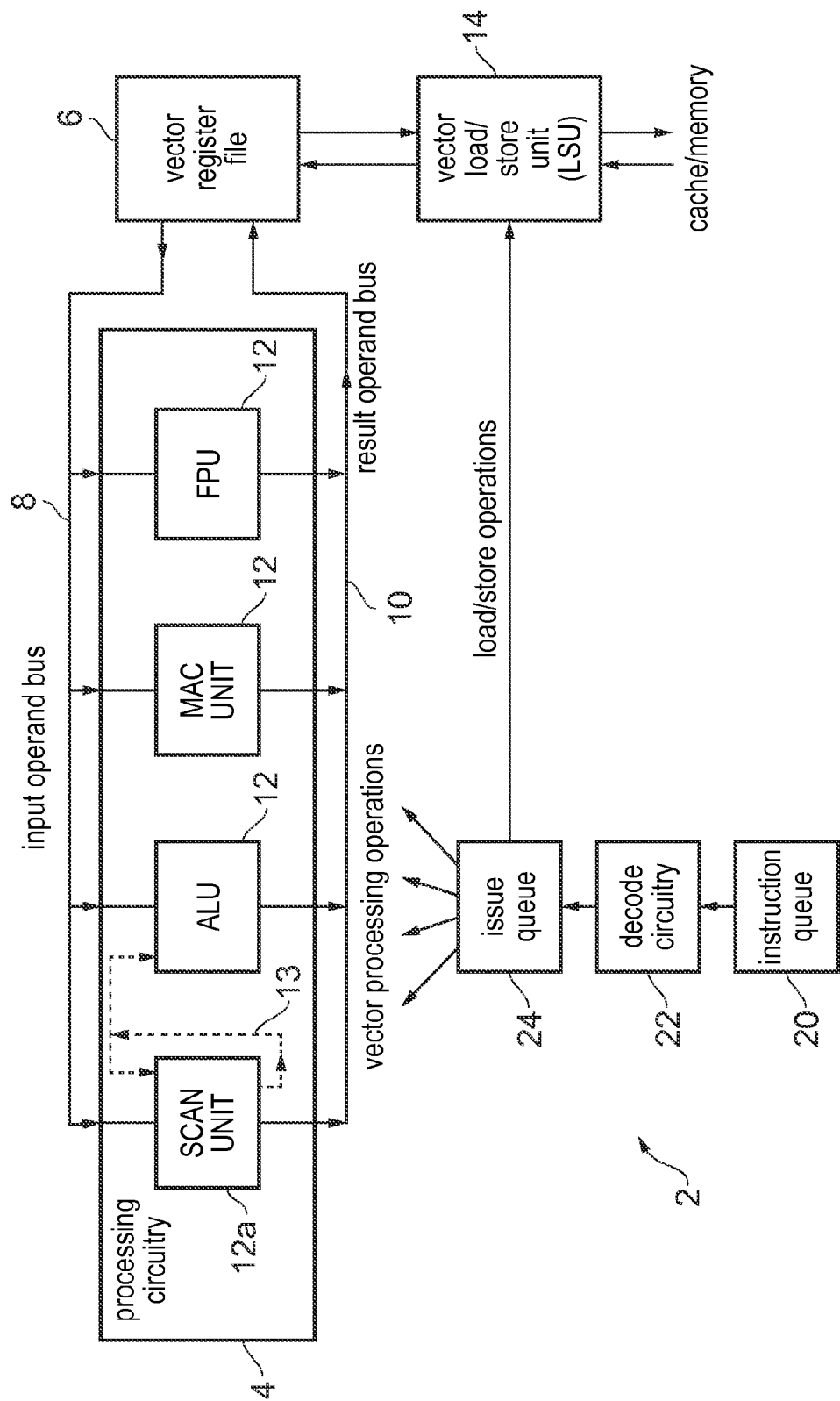
FIG. 1 schematically illustrates a data processing apparatus for processing vector operands.

While it may be possible to perform the vector scan operation using scalar operations performed in series, this can be slow and so for performance reasons it can be useful to parallelize at least some of the combinations. However, while known parallelized techniques may combine power of two numbers of vector data elements relatively efficiently, when an additional data element S needs to be combined with the vector data elements as well then this may require an extra step. Existing techniques either combine the additional data element S with a data element of the source vector operand in an initial step before combining different vector elements of the source vector operand, or perform all the combinations of different data elements within the source vector first, and then perform an additional step for combining the additional data element with each data element generated in the earlier steps. Either way, this may require an extra step.

The inventors of the present technique recognised that not all of the M data elements of the source vector operand may be of interest. For example, there may not be enough data to completely fill M data elements of the source vector operand, and so only N data elements of the result operand may need to be generated (where $N \leq M$). Known parallelized techniques for performing the vector scan operation do not consider this and focus instead on performing the scan operation over all M of the data elements. The inventors realised that by changing the way the vector scan operation is performed, it is possible to perform the operation more quickly in the case where only some of the result data elements are required, without increasing the number of steps required in the case where all M result data elements are desired.

To achieve this, the processing circuitry of the present technique performs the vector scan operation in a plurality of steps, each step generating a second vector from a first vector, with the first vector for the first step comprising data elements from the source vector operand and the first vector for other steps comprising the second vector from the preceding step. At least two of the steps include a combination operation for combining a data element of the first vector with the at least one additional data element S (in contrast, the known techniques would only include one such step). By combining the at least one additional element S at multiple steps of the vector scan operation, it is possible for more of the data elements of the result vector to be available before the start of the final step, so that the vector scan operation can be performed more quickly in the case when fewer than M data elements are required.

M may be a power of 2. When N is between M/2 and M, then prior art techniques cannot perform the scan operation any faster than when all M data elements are generated since it is not possible then to use a smaller power of 2 as M. However, in the present technique it is possible to reduce the number of steps required when N is between M/2 and M.

The vector scan operation may be performed to generate the first G data elements R[0] to R[G−1] of the result vector operand in at least one combination step (where $M/2 \leq G < M$). If more than G data elements are required (N>G), then the other data elements R[G] to R[M−1] of the result vector operand can be generated by performing at least one further step in addition to the at least one combination step. This allows numbers of data elements less than M to be generated in fewer steps of a vector operation than previous techniques, to improve performance.

If $M/2 < N \leq G$, then the at least one further step can be omitted so that the operation can be performed more quickly using the at least one combination step, and the processing circuitry can begin performing another operation sooner than if the at least one further step was performed. Alternatively, the at least one further step could be performed even if fewer than G data elements are required (this could still provide a performance improvement if the at least one further step is performed after the at least one combination step, because the G data elements would still be available earlier than in the prior art). When N<M/2 then more steps of the vector scan operation may be omitted. For N<M/2, the processing can be treated in the same way as if M had been a smaller power of two.

The at least one further step may comprise at least one combination operation for combining a data element of the first vector with the at least one additional data element, and may not include any combinations of respective data elements of the first vector. This means that it is possible to perform the further step at any time relative to the at least one combination step (before the at least one combination step, after the at least one combination step, or as an intermediate step part way through the at least one combination step). More particularly, the at least one further step may comprise combination operations for combining the at least one additional data element S with data element [k] of the first vector for the at least one further step, where G≤k<N. These combinations may correspond to the combinations required for performing the vector scan operation over all M data elements, but which are not carried out by the at least one combination step.

On the other hand, the at least one combination step may be such that the final step of the at least one combination step, if performed without the further step, generates the result data elements R[0] to R[N−1] together with data elements [G] to [M−1] of the second vector for that step, where G≤k<M data element [k] of the second vector has a value corresponding to a combination of at least some data elements V[0] to V[k] of the source vector operand (i.e. without being combined with the additional data element S).

In general, for $M=2^P$, the at least one combination step may comprise P steps comprising combination operations for generating data elements [0] to [M−1] of a second vector in response to data elements [0] to [M−1] of a first vector, such that for 0≤J<P, step J of said P steps comprises, for $2^J \leq m < N$, a combination operation for combining data element [m] of the first vector with data element $[m-2^J]$ of said first vector to generate data element [m] of the second vector.

These combinations may ensure that the combinations of data elements V[0]; V[O] and V[1]; V[0], V[1] and V[2], etc. are carried out in the fewest steps possible. Although the control circuitry is configured to control the processing circuitry to perform these steps, some combinations within each step may be omitted (for example, if a data element to be processed by that step has not been selected for processing based on mask information). Also, while each of the P steps is defined as having combination operations for element $[2^J]$ to element [N−1], it is also possible for the combinations to continue up to element [M−1] so that the combinations are performed for all the data elements in the block of M data elements being processed, even when the number of selected elements N is less than M.

In the present application, the data element indices [0], [1], etc. are used to refer to the position of the data elements relative to other elements while being processed by the vector scan operation, which is not necessarily the same as the position of the data element when stored in a vector register. Which data elements of the source vector operand and result vector operand correspond to elements [0], [1], . . . , [M−1] may be an arbitrary design choice. For example, some systems may treat the element at the least significant position within the source vector register as element [0], and the element at the most significant position within the source vector register as element [M−1], while in other systems this may be the other way round. More arbitrary allocations of data elements could also be used. Hence, for example a combination of elements V[0] and V[1] in the vector scan operation could actually correspond to elements at non-adjacent positions within a vector register. Shift circuitry may be used to shift data elements into the required positions for the vector scan operation.

Also, the index J for the respective steps of the at least one combination step is used to define the combination operations performed in that step. It is not essential for the at least one combination step to be performed in ascending order of J. While in one embodiment the P steps may be performed in the order of J=0, 1, . . . , P−1, in other embodiments the P steps may be in a different order (e.g. 1, 2, P−1, 0, . . . ).

The at least one combination step may also include various combination operations for combining the at least one additional data element S with a vector data element. The additional data element S can be input and combined with elements of the source vector at different steps, depending on how many data elements (G) of the result vector operand are required to be generated in the case where the at least one further step is not performed. In general, G can be selected so that M−G is a power of 2, and the P steps of the at least one combination step may be such that, for $\log_2(M-G) \leq J < P$, step J of said P steps comprises, for $2^J - (M-G) \leq q < 2^J$, a combination operation for combining data element [q] of the first vector with said additional data element S to generate data element [q] of the second vector.

This approach allows the vector scan operation to be implemented so as to balance the number of result data elements R[0] to R[G−1] which are available by performing the at least one combination step against the extent to which the vector scan operation can be interleaved with another operation for generating the at least one additional data element S.

For larger values of G (e.g. G=M−1 provides the largest possible value of G), more data elements of the result data operand are available from the at least one combination step, so that there are more occasions when the at least one further step can be omitted to improve performance (N is more likely to be less than or equal to G). For G=M−1, the at least one further step would only be required if all M of the data elements of the result vector are required to be generated using the scan operation. However, this approach may require the additional data element S to be input at more steps, and so the additional data element S may need to be available earlier, so that the vector scan operation might need to wait for an earlier operation to generate the additional data element S before starting.

On the other hand, for smaller values of G (e.g. G=M/2) the input of the at least one additional data element S can often be delayed because fewer steps include combinations involving the additional data element S. This can be useful to allow the vector scan operation to start before the additional data element S is ready, so that the vector scan operation can complete sooner. However, for smaller values of G a greater number of combination operations may be required than for larger values of G, and the performance improvement of omitting the at least one further step may not be available as often since there are fewer values of N for which the at least one further step is not required.

Hence, the system designers may select G depending on their requirements. Some processing circuitry may have hardware which is hardwired for a particular value of G, which may make it simpler to implement the control circuitry. Other systems may have control circuitry which can dynamically configure the processing circuitry to perform the processing for different values of G depending on whether the additional data element S is already available and how many data elements N are required for the particular operation.

As well as the result data elements R[0] to R[N−1], the vector scan operation may also generate a carry value which can be output for use by a further operation. For example, the carry value may be used as the additional data element S for a subsequent vector scan operation. The carry value may have a value corresponding to data element R[N−1] of the result vector operand. The control circuitry may control the processing circuitry to output the carry value earlier if the at least one further step is omitted than if it is performed, so that subsequent operations using the carry value can start earlier in the case where the at least one further step is not required.

One reason why the number of required data elements N may be less than the number of elements M in the block being processed may be that the vector scan operation has associated control information which identifies data elements as selected or non-selected data elements, with only the selected data elements to be processed by the vector scan operation. This control information may for example be mask information which identifies individual data elements as selected or non-selected data elements, vector length information which specifies how many of the data elements are selected, or vector format information which identifies a particular pattern of selected and non-selected elements. In general, N may have a value such that element V[N−1] of the source vector operand is the last selected data element indicated by the control information (there may be some non-selected elements with element indices less than N−1).

For any non-selected data elements indicated by the control information, the corresponding data elements in the result vector operand may be set to a predetermined value (e.g. zero), a value determined by performing the vector scan operation with non-selected data elements of the source vector operand set to a predetermined value (e.g. zero), or a value of a corresponding data element in a source register for storing the source vector operand or destination register for storing the result vector operand (in some cases the source and destination registers may be the same). In some embodiments, the combination operations which process non-selected data elements may be inhibited. Alternatively, the parts of the vector scan operation corresponding to a non-selected element may proceed as normal. Either way, the result can be adapted to one of the values described above, for example by performing an operation in parallel with the vector scan operation to write the required values to the non-selected portions of the destination register.

Another reason why the vector scan operation as described above may use fewer than M of the data elements is that it is possible to segment the vector scan operation so that different scans are performed on different segments within the M data elements. In this case, the first segment may be processed in the way described above with N being the number of data elements in that first segment. If there are further segments then the scan operation may be performed by combining one or more data elements within that further segment, but without including the at least one additional data element S. For example, for an additional data element S and 8 vector elements V[0] to V[7] with elements V[0] to V[2] corresponding to a first segment and elements V[3] to V[7] corresponding to a second segment, a series of combinations may be generated as follows:

| | |
|---|---|
| S, V[0] | V[3] |
| S, V[0], V[1] | V[3], V[4] |
| S, V[0], V[1], V[2] | V[3], V[4], V[5] |
| | V[3], V[4], V[5], V[6] |
| | V[3], V[4], V[5], V[6], V[7] |

The present technique lends itself well to a segmented scan when N<M. As discussed above the at least one combination step may generate the additional data elements [G] to [M−1], which do not include the additional data element S and so can correspond to the result data elements for the second segment. Also, when there are at least two segments in a segmented scan, then there are fewer operations required for combining data elements of the vector that are far apart from each other. The vector scan operation can be arranged so that it is the at least one further step which provides these "far apart" combinations, which are more likely to be not required in the case of a segmented scan, allowing a performance improvement more often. For example, when G=M−1 then if there is any segmentation at all then the at least one further step will not be required, because when G=M−1 then the further step combines the additional data element S with the final data element [M], and this combination is not required if there are multiple segments. Hence, a segmented scan can be accelerated using the present technique.

The M data elements that are processed using the scan operation as discussed above need not comprise all of the data elements of the source vector operand. For example, the source vector operand may comprise X data elements where X>M and the result vector operand may comprise Y data elements where Y>M. Usually, the source and result vector operand will have the same number of data elements (X=Y), but it may be possible to perform the vector scan operation at the same time as converting the vector size to a greater number of elements, so that the vector scan operation populates some of the elements of a result vector which is larger than the source vector. More generally, the vector scan operation may be performed on L data elements of the source vector operand, where L≤X, and L≤Y. If L>M, then the data elements R[0] to R[M−1] may be the same as discussed above, but for R[M] to R[L−1] then the result data elements may correspond to a combination of R[M−1] with at least some of the data elements with indices greater than M. The value N discussed above may correspond to L if L≤M, or if L>M then N=M.

The technique described above for the M data elements need not be applied across the entire source vector operand. For L>M, it is possible for only the M data elements to be processed with the at least one combination step and at least one further step as discussed above, with the elements R[M] to R[L−1] being generated using a different technique.

One reason why this might be desirable is that some processing circuitry may only be capable of processing a limited number of data elements in parallel, which may be less than the total number of data elements to be processed. If there are more data elements than can be processed in parallel by the processing circuitry, then the control circuitry may control the processing circuitry to perform partitioned scan operations separately for different groups of data elements within the source vector operand. The partitioned scan operations together may give the same result as a single vector scan operation performed over a greater number of data elements, if the combination operations being performed are associative. If the combination operations are not associative (e.g. certain floating point operations), there could be a difference in the result obtained from the partitioned scan operations compared to a single larger scan, but this may still be acceptable. Hence, M may be the number of data elements that can processed in parallel with the processor, and if L>M then partitioned scan operation may be performed on separate groups of M data elements or fewer.

It would be possible to perform the partitioned scan operation for each group of M data elements in the way described above where the additional data element is input at multiple steps and G of data elements are ready without needing the at least one further step. However, the inventors found that this can reduce performance because each subsequent partition scan operation may be dependent on the result of the at least one further step of the preceding operation, and so needs to wait for the result of the previous operation before proceeding.

Instead, the inventors realised that for a partitioned scan it can be more efficient to perform the vector scan operation so that only the first of the partitioned scans inputs the additional data element at at least two different steps and comprises the at least one combination step and at least one further step as described above. For at least one further group, the partitioned scan operation may instead comprise at least one preliminary step which combines respective data elements of the further group of data elements and at least one additional step which combines results of the preliminary step with a data element that is generated in the separate scan operation for another group of data elements. This approach can allow the overall scan operation to be performed more quickly because the at least one preliminary step for the further group of elements can be interleaved with the scan operation for the first group of data elements as there is no dependency between the preliminary step and the separate scan for the first group.

The additional data element S may have various forms. For example, the additional data element may be a scalar operand, a data element from a vector operand, a value determined using multiple data elements of the vector operand, or a carry value produced by an earlier operation (for example, the carry value of an earlier vector scan operation or another partitioned scan operation within the same vector scan operation.

The combination operation performed for the vector scan operation may have various forms. For example, the combination operation could be any of the following operations: add, subtract, multiply, divide, AND, OR, NOR, XOR, NAND, maximum or minimum selection operation. For most of these operations the combination operation may be a binary combination operation which combines two data elements, although for some combination operations such as an addition or an AND operation then it may be possible to combine three or more data elements in each combination operation.

The present technique may also be implemented in virtual machine form by providing a computer readable storage medium which stores a computer program which, when executed by a computer, controls a computer to provide a virtual execution environment according to the apparatus described above.

FIG. 1 schematically illustrates an example of data processing apparatus 2 having processing circuitry 4 which supports vector processing. The processing circuitry 4 can process source vector operands received from a vector register file 6 via an input bus 8, and perform corresponding data processing operations on respective data elements of the source operands to generate a result vector operand which is output to the vector register file 6 via a result bus 10. The processing circuitry 4 is capable of performing operations on multiple data elements in parallel. The processing circuitry 4 has several functional units 12 for performing different types of processing operations. In this example, the functional units 12 includes an arithmetic logic unit (ALU) for performing arithmetic operations such as add, multiply, or shift, and logical operations such as AND, OR, XOR, etc; a multiply accumulate (MAC) unit for performing multiply accumulate operations; and a floating point unit (FPU) for performing floating point operations. The processing circuitry 4 also has a vector scan unit 12a for performing vector scan operations, which will be discussed below. It will be appreciated that other types of functional units may be provided. As well as being able to process operands received on the input bus 8, some of the processing units 12 may have bypass (forwarding) paths for routing an output operand from one of the functional units 12 to the input port of the same functional unit 12 or a different functional unit 12 so that the generated operand can be processed more quickly in a further processing step than if it had to be written back to the register file 6 and read out via the input bus 8. For example, in FIG. 1 there is a bypass (forwarding) path 13 for forwarding an output of the scan unit 12a to the input of the scan unit 12a or the input of the ALU 12. A vector load/store unit 14 is also provided for loading data from a cache or memory into the vector register file 6 and storing data from the vector register store 6 to the cache or memory.

The processing circuitry 4 corresponds to an execute stage of a processing pipeline which also includes an instruction queue 20, decode circuitry 22 and an issue queue 24. The instruction queue 20 receives instructions from the cache or memory and passes the instructions to decode circuitry 22. The decode circuitry 22 decodes the instructions to generate micro-operations to be processed by the processing circuitry 4, and dispatches the micro-operations to the issue queue 24. The micro-operations remain in the issue queue 24 until their operands and any control information required for processing become available, at which point the micro-operation is issued for processing by one of the processing units 12 of the processing circuitry 4, or by the load/store unit 14 if the micro-operation is a load/store micro-operation. In some examples, the micro-operations may each correspond to an entire program instruction, and in other examples, the micro-operations may correspond to part of an instruction. For example, a complex instruction may be divided into micro-operations corresponding to different steps of the processing, or micro-operations for processing different portions of the source operand. The instruction queue 20, decode circuitry 22 and issue queue 24 may be considered to be control circuitry for controlling the processing circuitry 4.

One type of vector operation performed by the apparatus 2 is a vector scan operation, in which a combination operation is applied repetitively to an increasing number of data elements. The combination operation can take a variety of forms, for example an add operation, multiply operation, minimum or maximum selection operation, logical operation, and so on. As a result of the scan operation, a sequence of results is generated, each result relating to the application of the combination operation (which is often a binary combination) to a different number of the data elements. While the vector scan operation can be performed serially, it can be advantageous for performance reasons to parallelize the scan operation.

Figure 2:
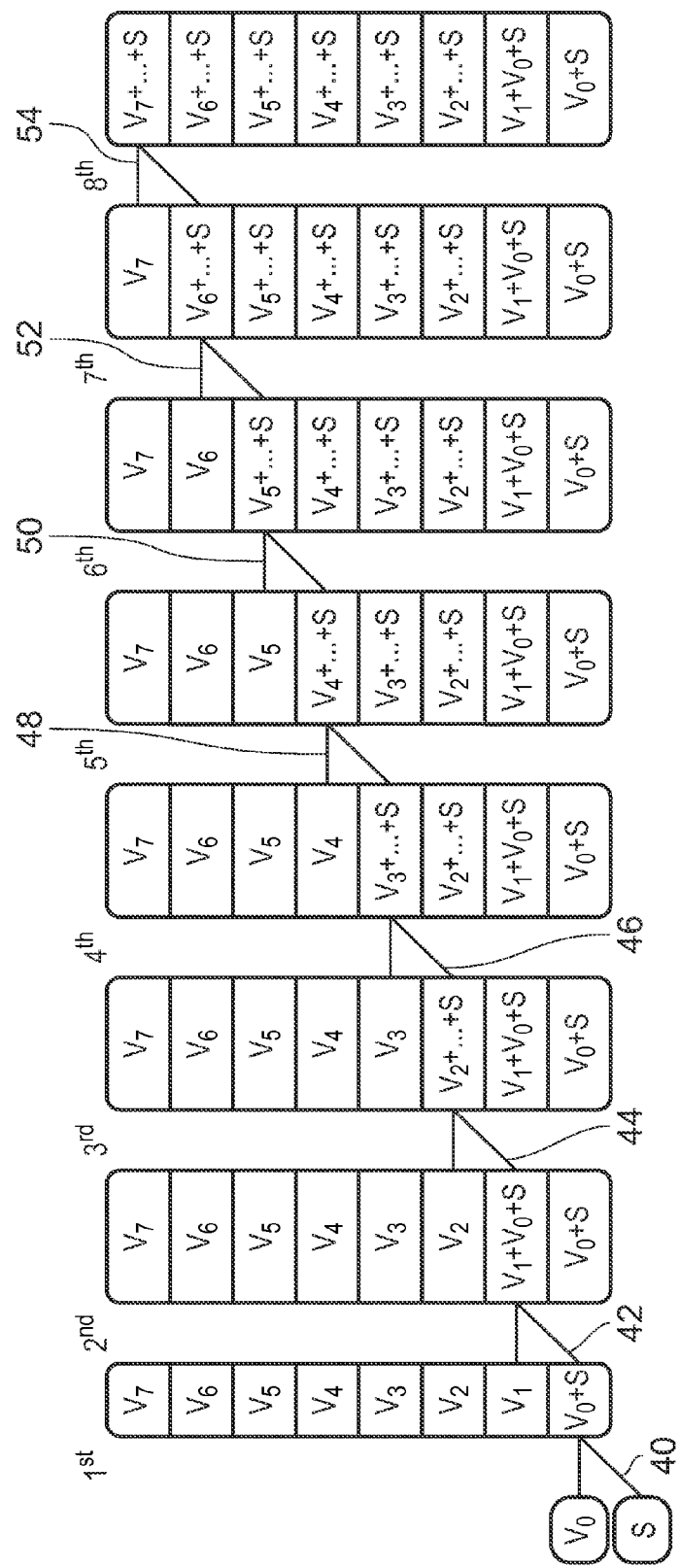
FIGS. 2 to 4 illustrate prior art techniques for performing a vector scan operation.

FIG. 2 shows a serial technique for performing the vector scan operation according to the prior art, in which the combination operation being applied is an add operation. The vector scan operation receives as inputs a source vector comprising data elements V[0] to V[7] and an additional data element S. The scan operation is performed as a series of steps 40 to 54 with each step performing a single combination of two elements. In the first step 40 the additional data element S is combined with the first vector element V[0]. In the second to eighth steps 42 to 54 further combinations of pairs of vector elements from the preceding step are performed so that by the end of the eighth step 54 a series of sums $V_0+S$, $V_1+V_0+S$, $V_2+V_1+V_0+S$, etc. have been determined. While the approach shown in FIG. 2 may be suitable for low-end systems to avoid incurring the hardware cost associated with performing the scan operation in parallel, and may be simple and energy efficient because it requires relatively few combination operations (for an M-element vector, M processing steps would be required), this approach is relatively slow as it requires M separate steps to be performed, and does not exploit the full performance gains available from parallelisation.

In a parallelized technique, a number of steps are performed with each step receiving a first vector and performing one or more combinations of respective elements of the first vector or combinations of the additional data element with an element of the first vector, to generate a second vector. The first vector for the first step is the source vector, and the first vector for other steps is the second vector produced by the preceding step. The second vector produced by the last step is the result vector.

Figure 3:
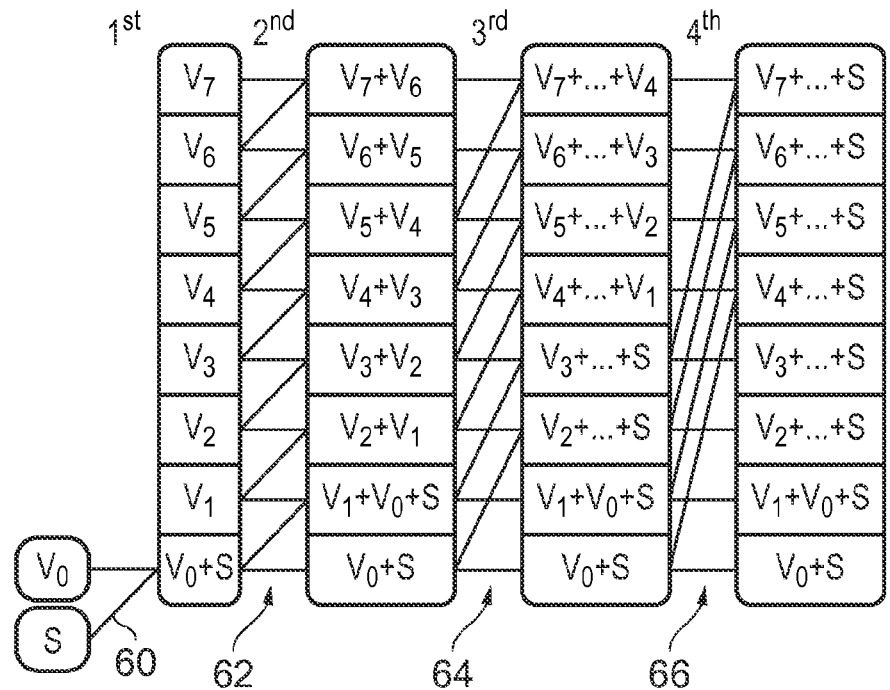

FIG. 3 shows a prior art technique for parallelizing the vector scan operation. In a first step 60 the additional data element S is combined with the first data element V[0] of the input vector. In the second step 62 vector elements V[1] to V[7] are combined with the adjacent elements V[0] to V[6] respectively (where V[0] has already been combined with the additional data element S). Similarly, in the third step 64 various combinations of vector elements that are two positions apart in the vector produced by the second step 62 are performed, and in the fourth step 66 combinations of elements spaced four positions apart are generated. This approach enables the number of processing steps required to be reduced to $\log_2(M)+1$ processing steps (the additional step is required for processing the additional data element S).

Figure 4:
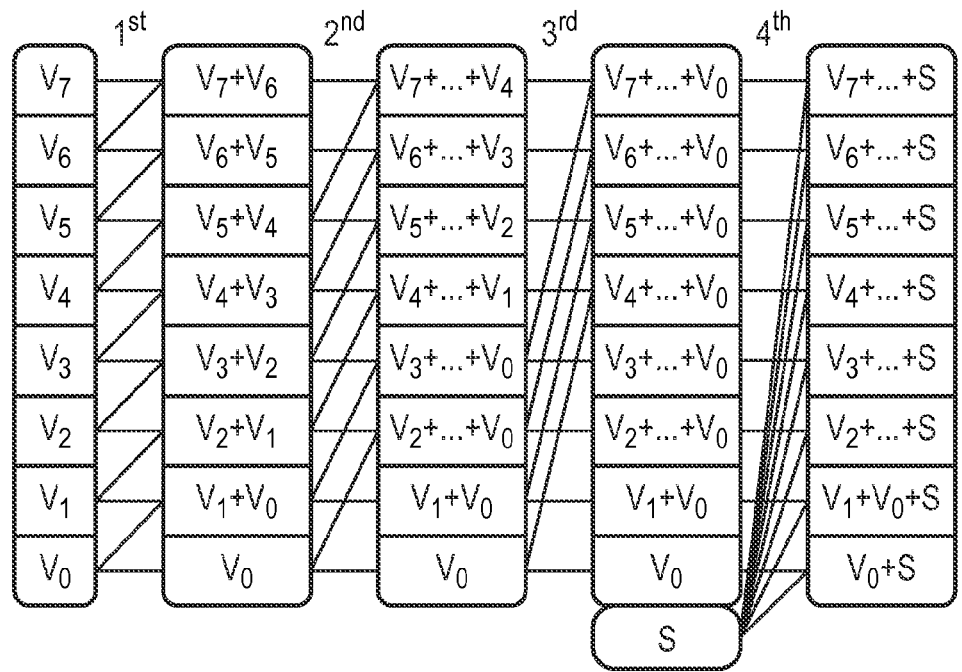

FIG. 4 shows an alternative prior art approach in which the first to third steps are essentially the same as the second to fourth steps of FIG. 3, but in which the additional data element S is combined in the final step instead of the first step. In this case, since the additional data element S is added in at the fourth step it is added to each of the vector data elements rather than just one. However, the total number of steps is still the same as in FIG. 3.

As shown in FIGS. 2 to 4 the prior art techniques only include one step which combines the additional data element S with one or more of the vector elements V.

However, the inventors of the present technique recognised that one issue that is not considered in the prior art is that the scan operation may be applied to an input vector for which not all of the data elements are active. It is possible to use a mask or similar control information to select only some of the data elements of the input vector for processing using the scan operation (see FIGS. 8 and 9 below for example). With the technique shown in FIG. 4, then all of the data elements of the result vector are generated in the fourth step and so even if only some of the result data elements are required, all four steps would need to be performed. For FIG. 3, the result data elements 0 to 3 are available by the end of the third step, but elements 4 to 7 are generated in the fourth step. Therefore, if more than 4 of the elements are required, all four steps must be performed.

This problem can be addressed by including multiple steps of the vector scan operation which combine the additional data element S with one or more of the vector data elements. In this way, the vector scan operation can include at least one combination step which generate G of the result data elements (where $M/2 \leq G < M$). If required, then the remaining data elements of the result vector can be generated by performing at least one further step, but this step can be omitted in the case where G data elements or fewer are required.

In the discussion below, the indices [0], [1], etc. are used to refer to the position of the element within the vector being processed by the scan operation, while the subscript indices $V_1$, $V_0$, etc. refer to the numeric value within the corresponding data elements of the source vector operand.

Figure 5:
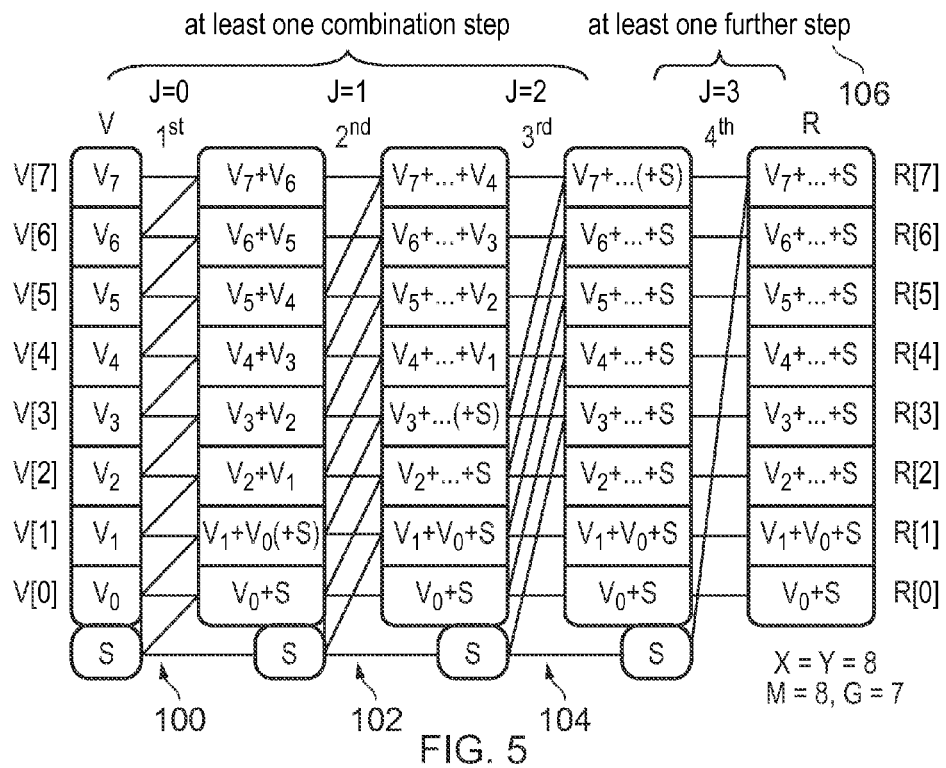
FIG. 5 schematically illustrates a first example of a vector scan operation.

FIG. 5 shows a first example of performing the vector scan operation according to the present technique. The vector scan operation is performed using at least one combination step (corresponding to steps 1-3 in the example of FIG. 5) and at least one further step (corresponding to step 4 in the example of FIG. 5). In this example, the additional data element S is combined with one of the vector elements in each step of the vector scan operation. In the first step 100, the additional data element S is combined with element V[0] of the source vector V, and in parallel with this combinations of pairs of adjacent data elements of the source vector are combined (for example, V[1] is combined with V[0], V[2] is combined with V[1], and so on). In a second step 102, the additional data element S is combined with element [1] of the vector produced by the first step 100, to produce a sum $V_1+V_0+S$, and pairs of elements [0]/[2], [1]/[3] etc. that are two elements apart are combined. In a third step, the additional data element S is combined with the element [3] of the vector produced by the preceding step, and elements [0]/[4], [1]/[5] etc. that are four elements apart are combined.

Hence, by the end of the at least one combination step, all but one of the result data elements R[0] to R[6] are ready since the sums over elements V[0] to V[6] of the source vector with the additional data element S have already been calculated. The only missing element is R[7], for which the sum V7 to V0 has been calculated but the additional data element S has not been combined yet (indicated by "+S" being in brackets for element [7] at the end of step 3). Hence, in the further step 106 the only combination required is to combine the additional data element S with element [7] produced by the preceding step to produce the last result element R[7].

Hence, it is possible to generate 7 of the result data elements R[0] to R[6] in one fewer step than in the prior art techniques shown in FIGS. 2 and 3. If the last data element R[7] is not needed, then the further step 106 can be omitted to improve performance (saving at least one processing cycle). If a vector ALU is used for the scan unit 12a, the processing circuitry 4 and scan unit 12a may not need to be modified significantly to perform the modified scan operation shown in FIG. 5, because in general for an M-element vector the scan unit 12a may already have M parallel processing units for performing combination operations, and none of the steps shown in FIG. 5 require more than M combination operations. A shift stage can shift the additional data element S and the vector elements V into the required position for processing.

The approach shown in FIG. 5 has advantage that 7 of the 8 data elements may be available one step earlier than the final step of the scan operation. More generally, for an M element vector it is possible to generate G=M−1 of the result elements one step earlier than in the prior art. However, this may require the additional data element S to be input in each of the steps and so if the additional data element S is not yet available then the first step 100 of the vector scan operation would have to be delayed.

Figure 6:
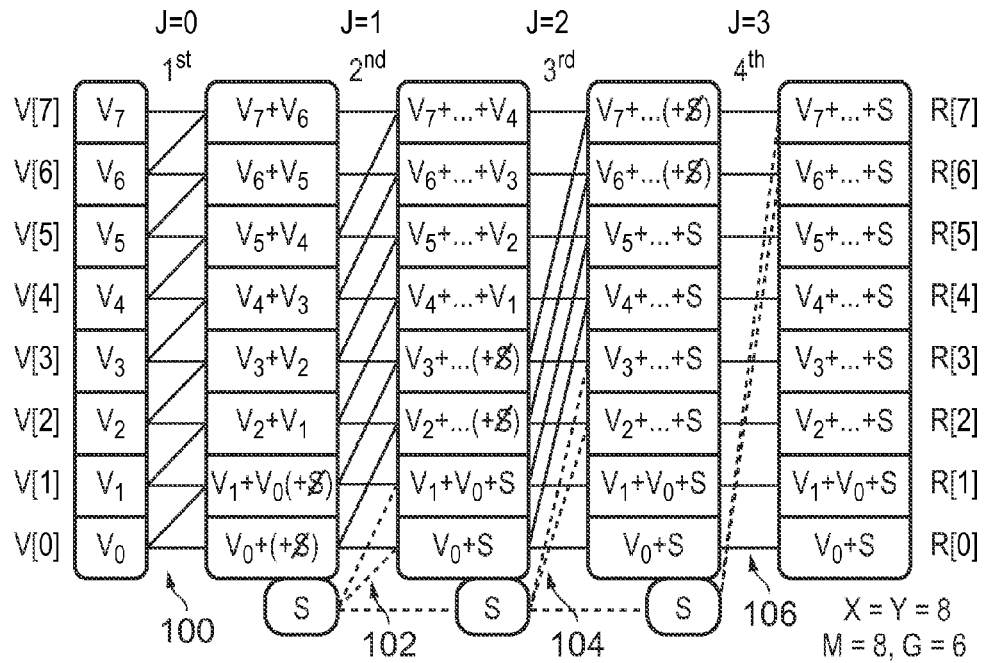
FIGS. 6 and 7 illustrate second and third examples of a vector scan operation in which the input of an additional data element S can be delayed for one or more processing steps.
Figure 7:
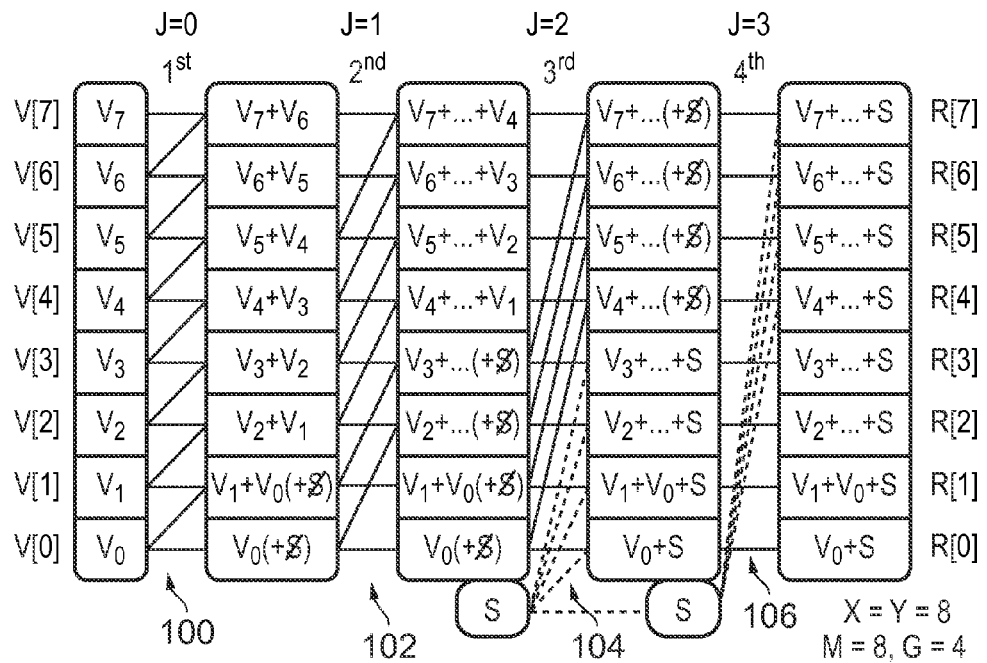

FIGS. 6 and 7 show alternative examples of the present technique in which the additional data element S is not required in the first step so that the vector scan operation can start before the additional data element is available to improve performance.

In the example of FIG. 6, the additional data element S can be delayed by one step. In this example in steps 100, 102, 104 the combinations of respective vector elements V are the same as in FIG. 5. However, the first step 100 does not combine the additional data element S with element V[0] of the source vector. To ensure that sufficient result data elements are generated by the end of the third step, the second and third steps 102, 104 may combine the additional data elements S with two of the vector elements instead of one as in FIG. 5. Hence, in the second step 102 the additional data element S is combined with elements [0] and [1] of the result of the first step 100, and in the third step 104 the additional data element S is combined with elements [2] and [3] of the result of the second step 102. This means that by the end of the third step 104 six of the result data elements R[0] to R[5] are ready, but there are two elements R[6] and R[7] which are generated using the further step 106 which combines the additional data element S with elements [6], [7] from step 104.

Similarly, in FIG. 7 the additional data element S can be delayed for a further step so that it is only input in steps 104, 106 and is not required for the steps 100, 102. This allows the vector scan operation to start earlier than in FIG. 6. Again, the combinations of vector elements are the same as in FIGS. 5 and 6, but in this case the additional data element S is combined with the lowest four data elements [0] to [3] in step 104 and with the upper four data elements [4] to [7] in step 106. Hence, only the lowest of four data elements are available by the end of the third step and so this time the furthest step 106 generates the final four data elements of the result vector. Note that while the technique of FIG. 3 also generates four elements at the end of the third step and the other four elements at the end of the fourth step, the technique of FIG. 3 requires the additional data element S to be input at the first step, while the technique of FIG. 7 can delay the input of the additional data element S for two steps to allow the vector scan operation to start before the additional data element S is ready, so that performance can be improved.

Hence, there is a trade-off between the number of cycles for which the additional data element S can be delayed and the number of data elements G of the result vector R that are available by the end of the at least one initial step. In general, for a vector scan operation applied over M data elements (where M=$2^P$), and where M−G is a power of two, then a generic description of the combinations performed in each step in the present technique is as follows. The vector scan operation may comprise:

at least one combination step comprising P steps (e.g. steps J=0 to J=2 in FIG. 5), where:

for 0≤J<P, step J of the P steps comprises, for $2^J$≤m<N, a combination operation for combining data elements [m] and [m−$2^J$] of the first vector supplied to that step to generate element [m] of the second vector output by that step; and for $\log_2$(M−G)≤J<P, step J of the P steps comprises, for $2^J$−(M−G)≤q<$2^J$, a combination operation for combining data element [q] of the first vector with the additional data element S to generate data element [q] of the second vector.

at least one further step comprising, for G≤k<N, a combination operation for combining the at least one additional data element S with data element [k] of the first vector supplied to the at least one further step.

N is the number of data elements of the result vector which need to be generated in this particular operation (e.g. N may be less than M if some of the data elements are masked out).

While FIGS. 5-7 show examples where the at least one combination step is performed before the at least one further step, it is also possible to perform the steps in a different order. For example, the further step could be performed first, or part way through the other steps. Also, the P steps could be performed in a different order.

Figure 8:
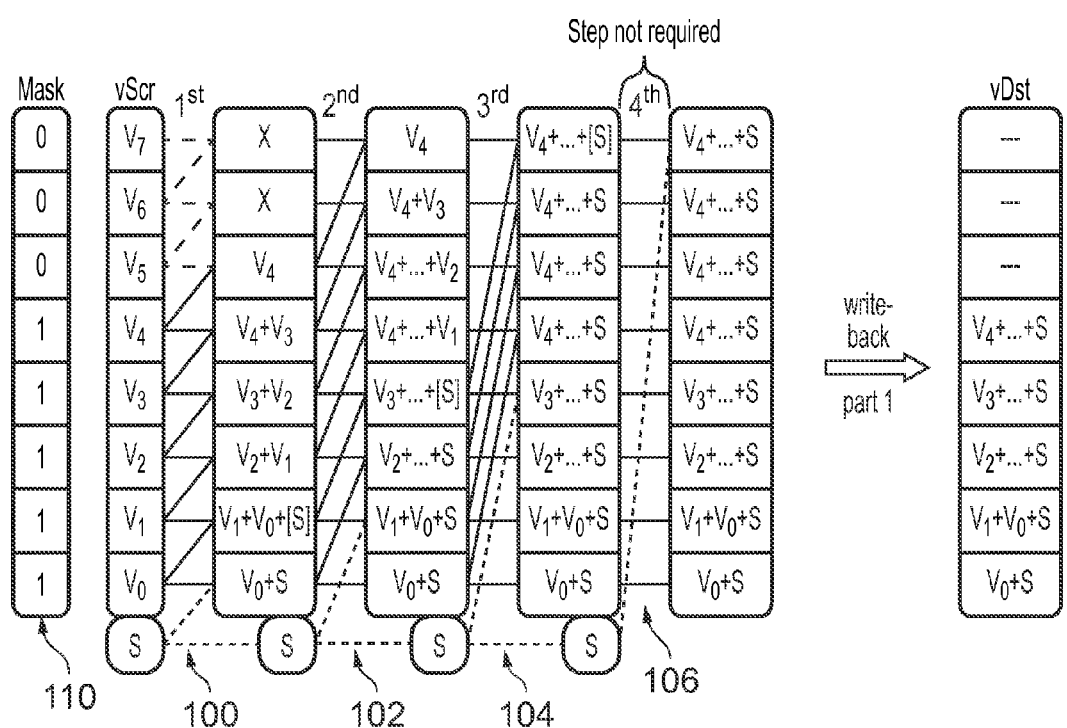
FIGS. 8 and 9 show examples of using mask information to control which data elements are processed in the vector scan operation.

FIG. 8 shows a first example of using mask information 110 to control the vector scan operation (this example corresponds to FIG. 5, but it is also possible to use a mask in a similar way for the other embodiments). Each bit of the mask operation corresponds to one of the elements of the source vector and if the mask bit is 1 then the corresponding vector element is a selected (active) element to be processed, and if the mask bit is 0 then the vector element is not selected for processing. Hence, in the example of FIG. 8 only the lowest five elements of the vector are selected. The processing of the selected elements proceeds in the same way as shown in example of FIG. 5. However, the mask bits of 0 disable the input of the source vector elements V[5] to V[7], so that the values in these elements are effectively treated as x ("don't care" values—it doesn't matter whether they are 0 or 1). For each combination, if one input is "x" and the other input is not "x", then the "non x" input is forwarded to the output. If both inputs are "x" then the output is also set to "x". Hence, elements [5] to [7] resulting from the first step 100 have values of $V_4$, x and x respectively. The second and third steps 102, 104 proceed in the same way as in FIG. 5. Since the result for the lowest five elements are available by the end of the third step (the combinations of S to $V_4$ are complete), the fourth step 106 is not required and so can be omitted.

Figure 9:
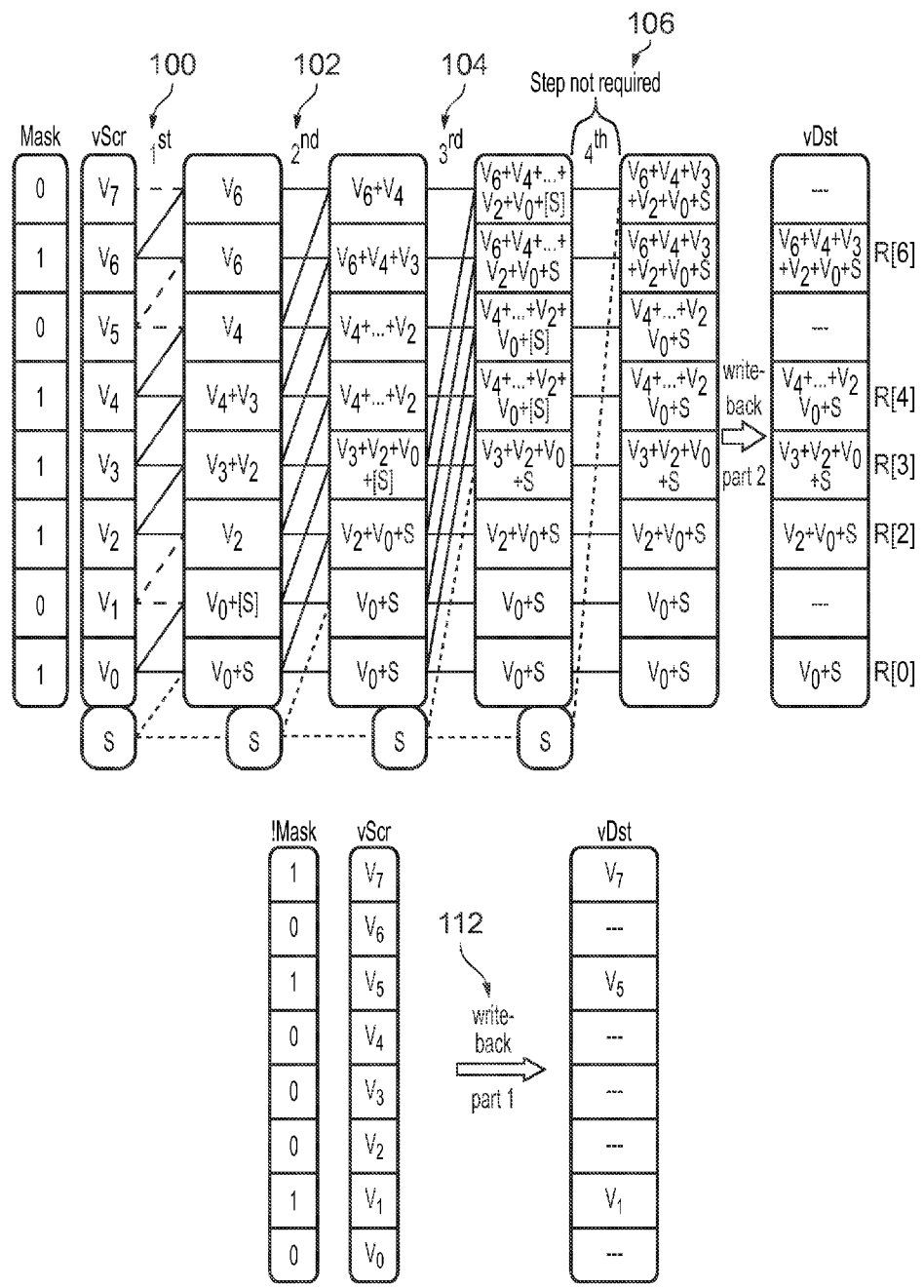

Similarly, FIG. 9 shows an example in which the mask sets a number of discrete elements located at non-adjacent positions as non-selected elements. In this example, vector elements [1], [5] and [7] are marked as non-selected using the mask bits of 0. Again, non-selected elements are treated as x ("don't care") and so the values $V_1$, $V_5$, $V_7$ from these elements are not propagated forward in the first step 100. This means that the result elements corresponding to selected elements take the value of a sum over only the selected elements (skipping the non-selected elements). For example, result data element R[6] has a value $V_6$+$V_4$+$V_3$+$V_2$+$V_0$+S which does not include the values $V_5$, $V_1$ from the non-selected elements. Again, as all the required elements are ready by the end of the third step 104, the further step 106 is not required. In general, for a value N selected such that N−1 corresponds to the index of the last selected element of the vector, then the last step 106 can be skipped if N≤G, the number of data elements available by performing only the first to third steps 100-104.

FIGS. 8 and 9 show examples in which the processing of non-selected elements proceeds as normal, but with values set to 0. It is also possible to inhibit processing of these elements completely. FIGS. 8 and 9 show an example using mask information to define the selected and non-selected elements, but it is also possible to use other types of control information such as vector length parameter or vector format information.

Also, the result data elements corresponding to non-selected elements may be set to different values. FIG. 9 shows a writeback operation 112 which can be performed in parallel or in series with the vector scan operation, to write a value into the non-selected elements of the result vector. Elements of the result vector indicated by "- - -" are not modified by the writeback operation. FIG. 9 shows an example in which the values of the non-selected elements of the source register are written to the corresponding positions of the destination register (this can be achieved by inverting the mask and using the inverted mask to control a register write). In other examples, a predetermined value (such as 0 or all 1 bits) could be written to the non-selected elements, or the previous value stored in the non-selected elements of the result vector could be retained (this may still require a write back operation if register renaming is used, for example).

Figure 10:
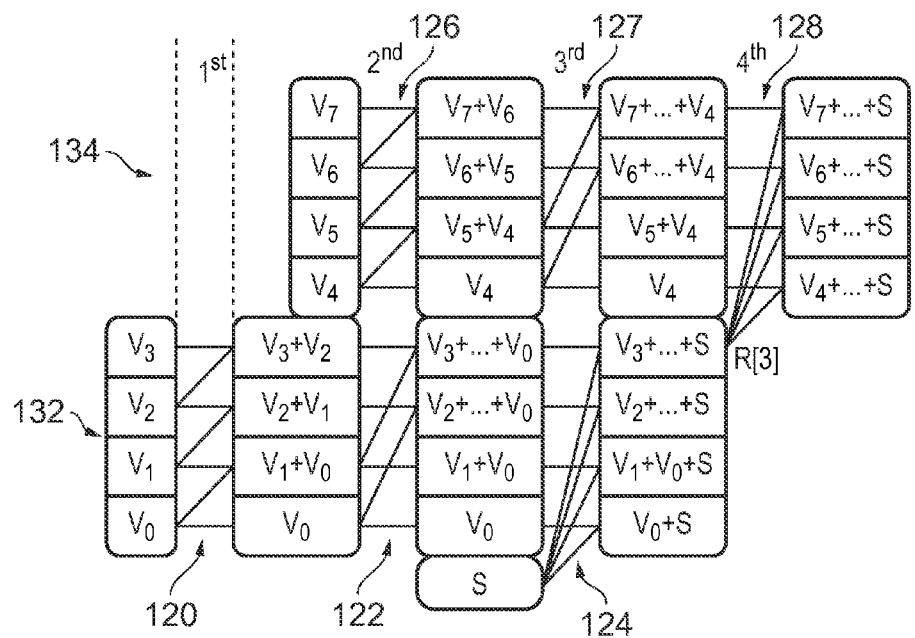
FIG. 10 shows a comparative example of performing a partitioned vector scan operation when applied to the prior art technique of FIG. 4 (FIG. 10 is not in itself prior art)

FIGS. 5 to 9 show examples where an 8-element vector is processed with a scan unit 12a capable of performing 8 combinations in parallel. It is also possible to use a scan unit 12a which has a smaller data path width so that it can only process some of the data elements in parallel. This can be useful to reduce the hardware cost of implementing the vector scan operation. For such a scan unit 12a, the vector scan operation can be split into separate partitioned operations which together give the same result as a scan operation performed over all of the data elements. FIG. 10 shows an example of a partition scan operation applied to the prior art technique of FIG. 4, but FIG. 10 is not itself prior art. In the example of FIG. 10, the scan operation is performed in a number of steps 120 to 128. Steps 120 to 124 correspond to a first partitioned scan operation 132 performed using the elements V[0] to V[3] of the source vector and the additional data element S, and steps 126 to 128 correspond to a second partitioned scan operation 134 using the upper four elements V[4] to V[7] of the source vector and the result element R[3] produced by the first partitioned scan operation 132. Steps 120, 122, 124 of the first partition 132 perform the same combinations as the first, second and fourth steps of FIG. 4 when applied only to the lower four elements [0] to [3]. Similarly, steps 126, 127, 128 of the second partition 134 correspond to the first, second and fourth steps of FIG. 4 for the upper four elements [4] to [7]. Since there is no dependency between steps 126, 127 of the second partition 134 and steps 120-124 of the first partition 132, these steps can be interleaved to perform the scan operation relatively efficiently using a scan processing unit 12a with a narrower datapath width.

Figure 11:
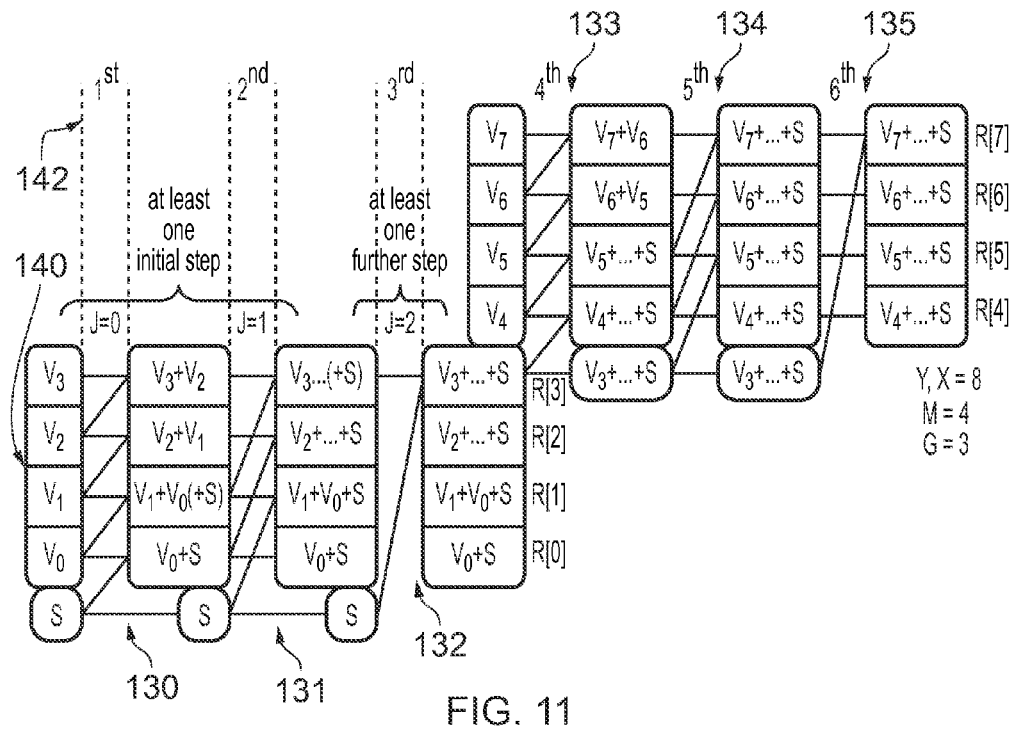
FIG. 11 shows a first example of applying a partitioned scan to the embodiment of FIG. 5.
Figure 12:
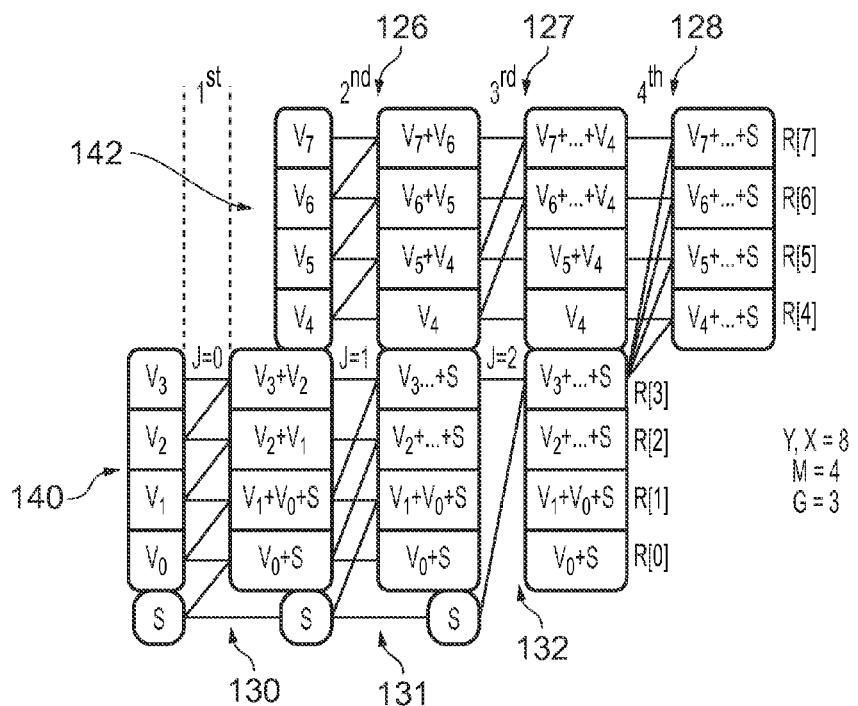
FIG. 12 shows a second example which provides a more efficient technique for performing the vector scan operation of FIG. 5 in partitioned form.

FIGS. 11 and 12 show examples of performing a similar partition scan but applied to the scan operation of the present technique as shown in FIG. 5. FIG. 11 shows a first example in which the first partition 140 comprises steps 130, 131, 132 which are the same as steps 1 to 3 of FIG. 5 but performed only for elements [0] to [3]. This allows 3 of the elements generated by the first partition to be ready by the end of step 131. However, as shown in FIG. 11 if the second partition 142 is performed using steps 133, 134, 135 corresponding to the same combination operations as steps 130, 131, 132 respectively, then this requires the second partition 142 to wait until the last step 132 of the first partition 140 is finished, because step 133 of the second partition is dependent on element R[3] produced by step 132 of the first partition. Therefore, with this approach the vector scan requires 6 steps.

FIG. 12 shows a more efficient way of implementing the partitioned scan using the present technique. In this example, the first partition 140 is the same as in FIG. 11, comprising steps 130, 131, 132. However, the second partition 142 is performed in the same way as the second partition 134 in FIG. 10 using steps 126, 127, 128. This means that steps 126, 127 of the second partition 142 are independent of steps 130-132 of the first partition 140 and so can be interleaved, so that the second partition 142 can start earlier, reducing the number of cycles for executing the operation as a whole. Nevertheless, unlike in FIG. 10, if fewer than 4 data elements are required then some steps of the first partition can be omitted to improve performance. Hence, a hybrid approach combining the ordering of FIG. 5 or other embodiments for the first partition and a different ordering for subsequent partitions can provide improved performance in a partitioned scan operation.

Hence, the ordering shown in FIG. 5-7 or other examples need not be applied over the entire vector being processed in the scan operation. It is possible to apply the technique shown above to only M of the data elements of the source vector (e.g. in FIG. M=4), and process the rest of the data elements of the same vector using a different ordering of the combination operations.

Figures 13, 14, 15:
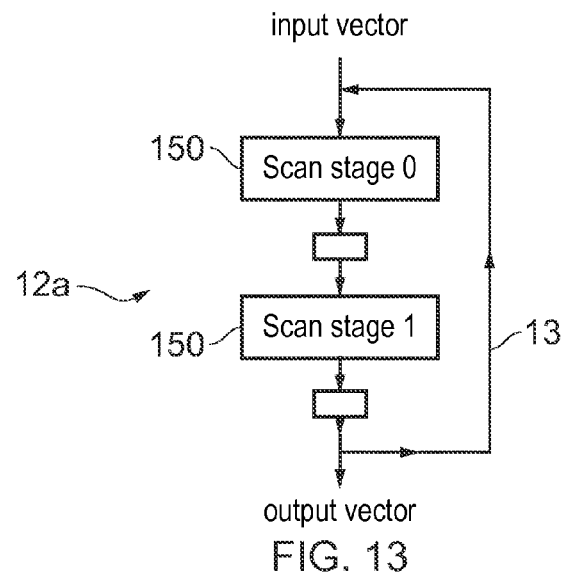
FIG. 13 shows an example of a vector scan unit comprising several scan stages for carrying out the vector scan operation.
FIGS. 14 and 15 show examples of pipeline utilization for the partitioned vector scan operations of FIGS. 11 and 12 respectively.

FIG. 13 shows an example of the vector scan unit 12a. The vector scan unit 12a may have multiple scan stages 150. To perform a single step of the vector scan operation as indicated in the previous examples the vector may be passed through each of the scan stages 150 so that by the end of the last scan stage the vector produced by that step of the scan operation is available. The bypass path 13 as discussed above may be used to forward the result of the last scan stage back to the first scan stage for use by a subsequent step. In some examples, there may be more than two scan stages.

FIG. 14 shows an example of the pipeline utilization of the scan unit 12a shown in FIG. 13 when the vector scan operation is partitioned in the way shown in FIG. 11. Each step of the scan operation requires two cycles, one cycle in the first scan stage zero and another in the second scan stage one. In the example of FIG. 11, the dependencies between different steps of the scan operation mean that the steps of the scan operation cannot be interleaved with one another because each step must wait for the result of the previous step. This means that 12 cycles are required. In contrast, FIG. 15 shows a corresponding pipeline utilization for the example of FIG. 12. In this case, there are fewer dependencies between different scan partitions of the scan operation, and so the different steps of the partitions can be interleaved so that while one step is in the second scan stage another step corresponding to the other partition is processed by the first scan stage. As shown in FIG. 15 this means that the pipeline utilization can be much higher and the overall operation can be completed in fewer cycles using the approach of FIG. 12 compared to FIG. 11.

Hence, the present technique lends itself well to processing the first partition of multiple partitions in a partition scan, but subsequent partitions may be more efficient to be performed using a different ordering of the combination operations.

Figure 16:
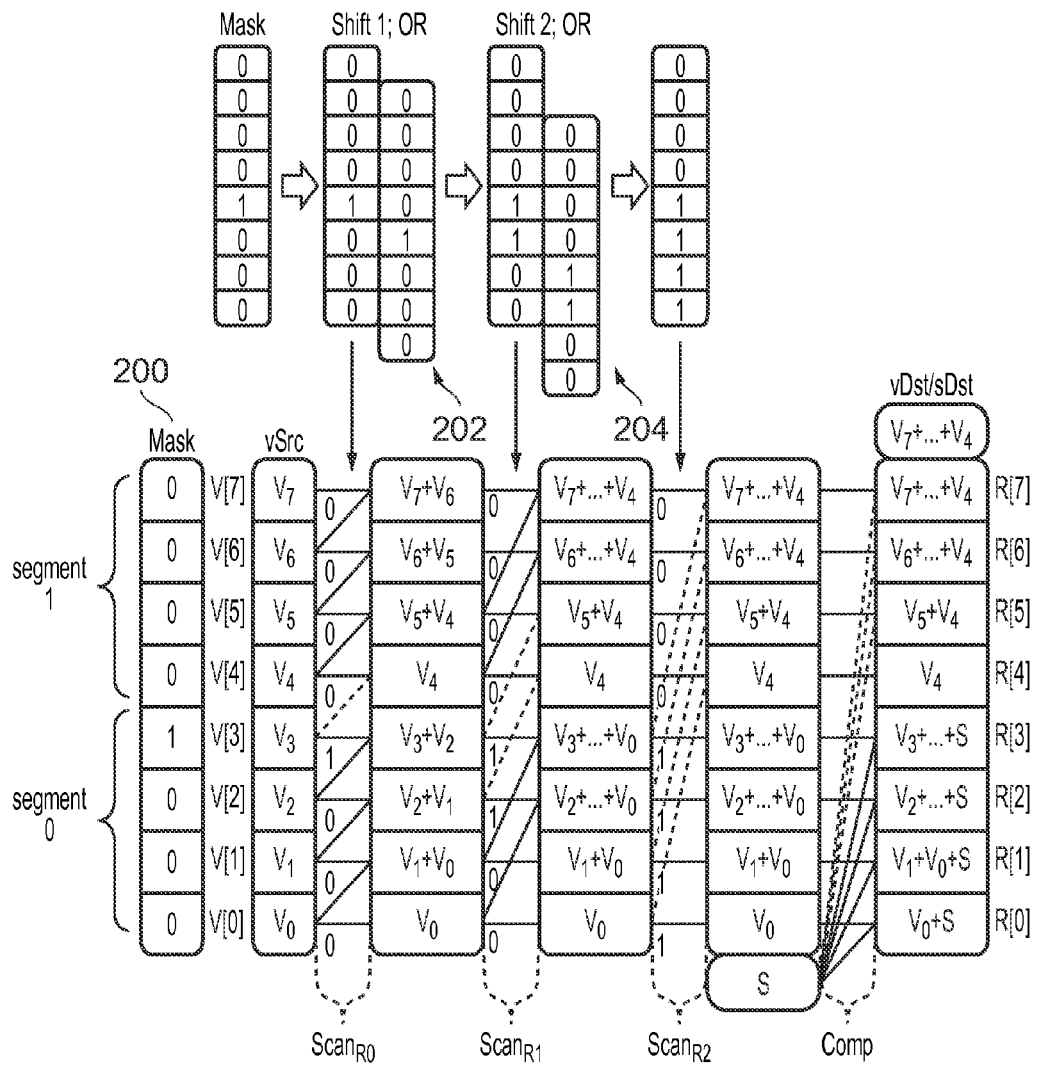
FIG. 16 shows a comparative example of a segmented scan operation applied to the prior art technique of FIG. 4 (FIG. 16 is not in itself prior art)

The present technique is also useful for systems which perform a segmented scan in which separate scans are performed over different segments of data elements in the vector. FIG. 16 shows the concept of a segmented scan, but when applied to the prior art scan operation of FIG. 4 (FIG. 16 is not itself prior art). Segment information 200 is provided to indicate the boundaries between different segments of data elements of the source vector V. Each '1' bit within the segment mask 200 indicates the boundary between one segment and another (the element marked with the '1' bit is the last element of the segment and the next element will start a new segment). For segment 0 (comprising elements [0] to [3] in this example) a scan operation is performed using the additional data element S and the elements of that segment. For any further segment (e.g. segment 1 comprising elements [4] to [7] in this example), vector elements from that segment are combined, but without including the additional data element. The combination operations proceed in the same way as in FIG. 4, but the mask is used to disable any combinations between elements in different segments (as indicated by the dotted lines in FIG. 16). This can be achieved by shifting the mask in the way shown at the top of FIG. 16 to generate masks for subsequent steps. For the first step the mask is applied in its original form. For the second step the mask 200 is shifted down one position and an OR of the two masks is generated as shown in part 202 of FIG. 16. For the third step the mask from the second step is shifted down two positions and ORed with the previous mask (see part 204 of FIG. 16). When processing vectors with more data elements, for any subsequent steps the mask would continue to be shifted down in increments of increasing powers of two for each step, and then ORed with the mask from the previous step. The final step of FIG. 16 simply adds the additional data elements S to any elements within the first segment 0. This step can also be controlled using the mask from the preceding step. The approach shown in FIG. 16 means that all steps are required in order to carry out the scan operation, since the additional data element S is not input until the final step.

Figure 17:
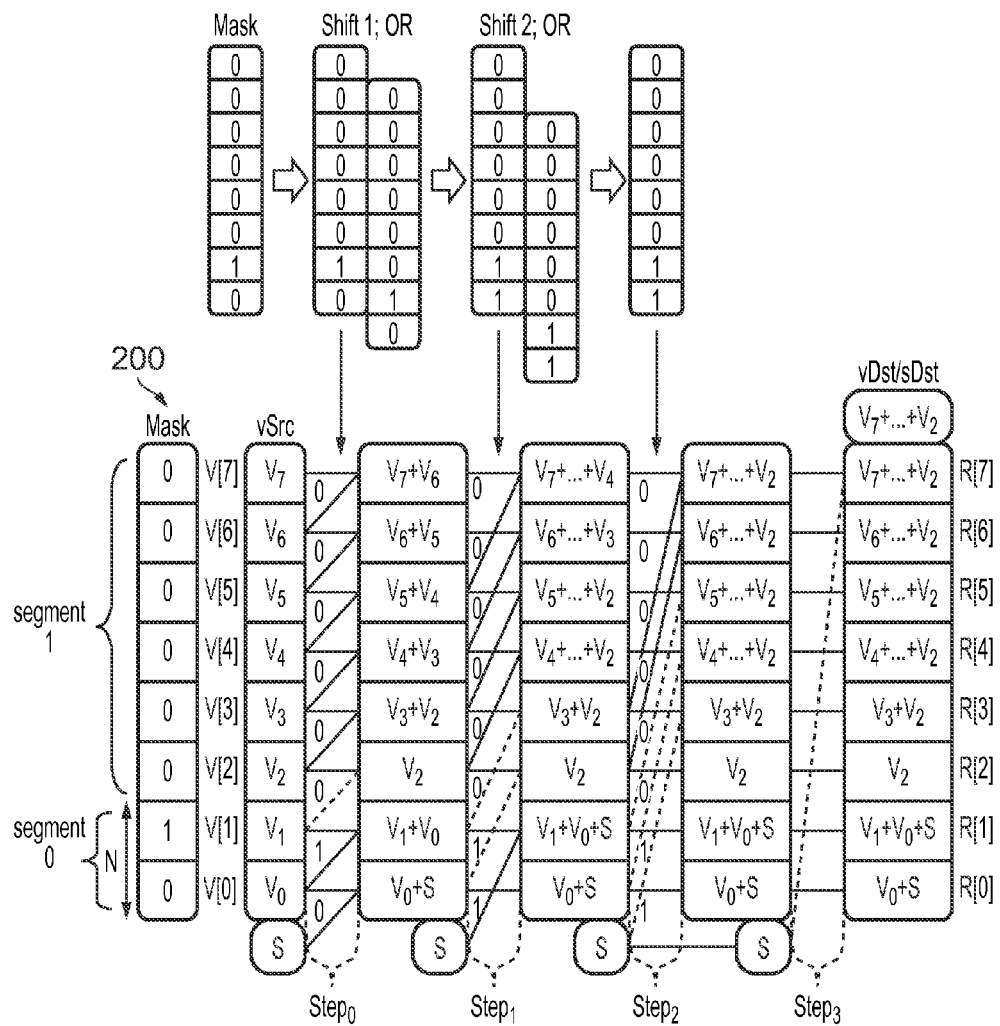
FIG. 17 shows an example of a segmented scan operation applied to the vector scan operation of FIG. 5.

FIG. 17 shows an example of the segmented scan, but using the ordering of the combination operations from the embodiment of FIG. 5. The masks for each step are generated in the same way as FIG. 16. However, by changing the ordering of the combinations as in FIG. 5, more of the result data elements are available by the end of the third step. Since the fourth step only includes a combination of the additional data element S with the final element [7] produced by the third step, and this combination will only be required if there is only one segment (i.e. the mask is entirely zero), then the final step can be omitted if there is more than one segment, regardless of the position of the segmentation or the number of segments. Therefore, the vector scan operation shown in FIG. 5 lends itself very well to the segmented scan operation since it will often be able to reduce the number of steps performed for a segmented scan. Similarly, the examples in FIGS. 6 and 7 may be implemented using a segmented scan operation and again this can help reduce the number of steps required when there are multiple segments.

Figure 18:
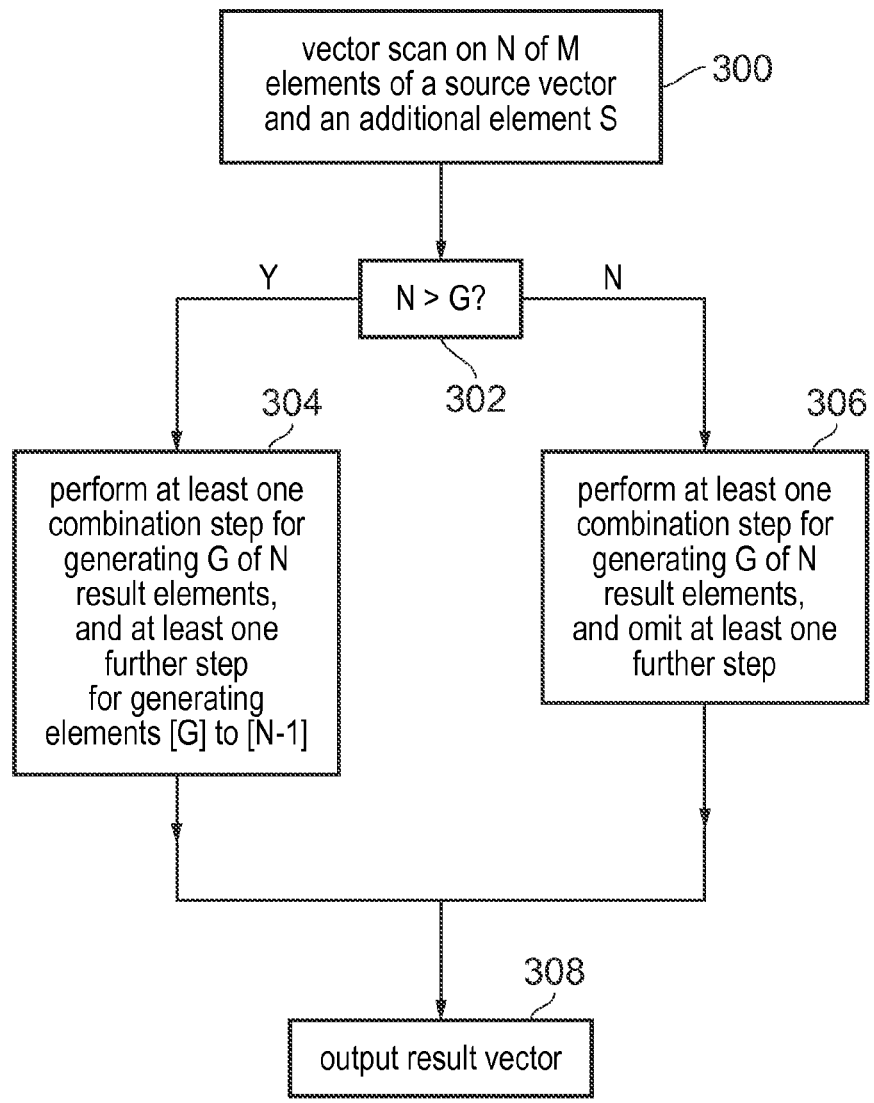
FIG. 18 shows a method of performing a vector scan operation.

FIG. 18 shows an example method of carrying out a vector scan operation. At step 300 the processing circuitry 4 receives a vector scan micro-operation which is to be performed using M elements of a source vector and an additional data element S. The additional data element S may be a carry value from a preceding operation, a vector element, or a scalar value for example. The vector scan operation has associated control information which specifies N elements to be scanned as a sequence using the additional data element (N may be less than M if the remaining elements are masked out as shown in FIGS. 8 and 9, or if the remaining elements are part of a subsequent segment which does not use the additional data element S as in FIGS. 16 and 17).

In response to the vector scan operation, at step 302 it is determined whether N is greater than G, which is the number of result data elements which can be generated using the at least one combination step. If N>G, then at step 304 the scan unit 12a performs at least one combination step for generating the G result data elements, and at least one further step for generating elements [G] to [N−1]. On the other hand, if N≤G then at step 306 the scan unit 12a performs the at least one combination step, but omits the at least one further step. At step 308 the result vector is output containing the result data elements.

Figure 19:
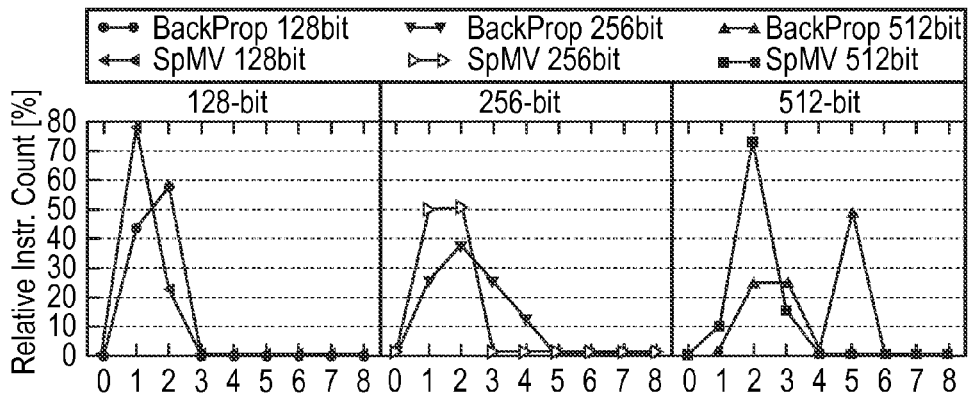
FIGS. 19 to 23 show results of a study into the number of vector scan instructions that use multiple segments or that use fewer than the maximum number of data elements, for which the present technique can provide a performance improvement.

FIGS. 19 to 23 show analyses of the observed usage of the vector scan operation when executing different types of processing algorithm. FIG. 19 shows the observed percentage of instructions that use different numbers of segments for the segmented vector scan, when applied to a back propagation algorithm (BackProp) and a sparse matrix vector multiplication algorithm (SpMV) for different data path widths. It is observed that, other than for the execution of the SpMV algorithm with a 128-bit data path, the majority of segmented instructions compute at least two segments and would therefore benefit from the present technique where the further step can be omitted when there are two or more segments.

Figure 20:
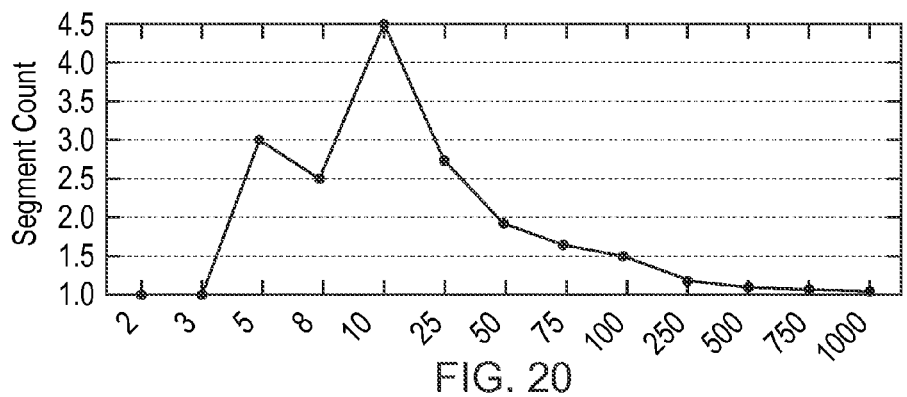
Figure 21:
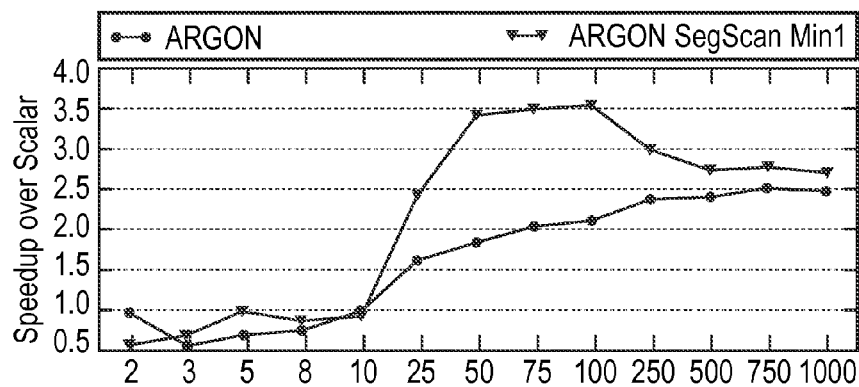

FIGS. 20 and 21 show the average number of segments computed and the potential performance benefits respectively for performing the SpMV algorithm with matrices of different sizes. As shown in FIG. 21, when comparing the speed up relative to a scalar operation, it can be seen that the performance obtained using segmented scans is particularly beneficial for matrix sizes between 25×25 and 100×100 elements. By comparing this with FIG. 20, this indicates that the segmented instructions which operate on at least 1.5 segments on average provide an improved performance such that the performance gains compensate for the computational overhead associated with controlling the segmented scan. This supports use of the present technique which can speed up segmented scans using more than one segment.

Figure 22:
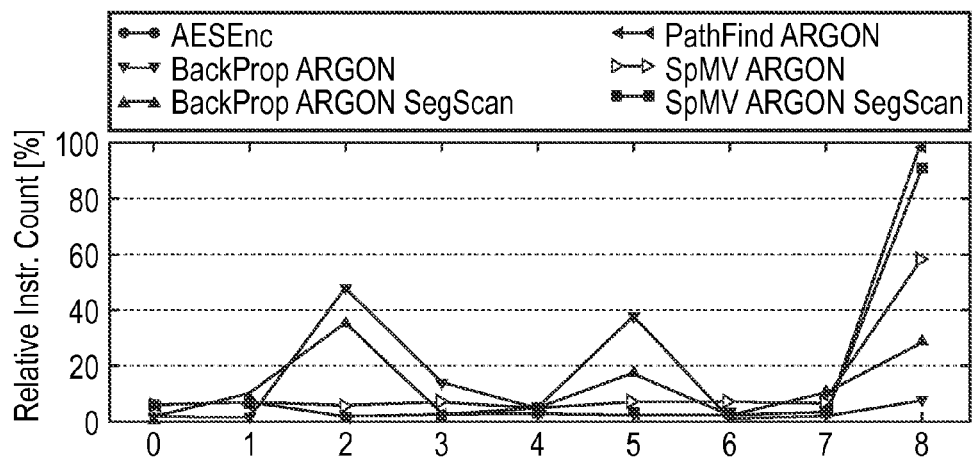
Figure 23:
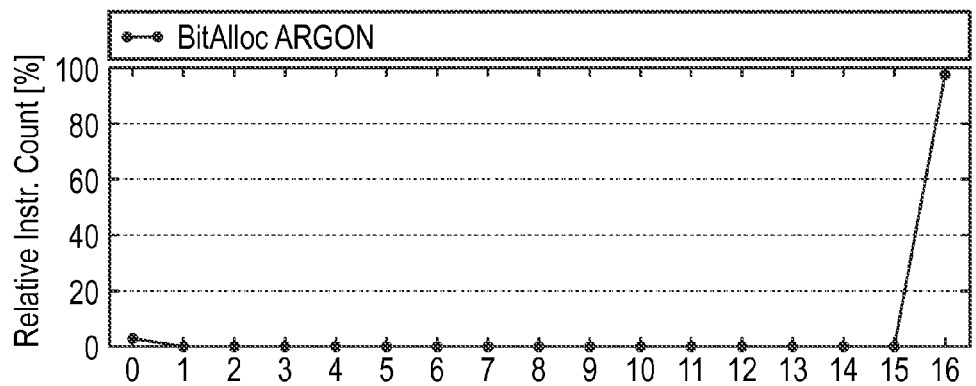

With respect to non-segmented scans, FIGS. 22 and 23 show analysis of the average vector length used by instructions. FIG. 22 shows an example for 32-bit data elements processed using a 256-bit wide data path for different benchmark algorithms. As shown in FIG. 22, there is a significant percentage of instructions which use only 2 or 5 data elements of an 8-data element vector. Although the previous technique of FIG. 3 would be able to reduce the number of steps when processing 8-element vectors with 2 active elements, it could not do this for a vector with 5 active elements. In contrast, the present technique can reduce the number of steps even when the number of active elements of an M-element vector is between M/2 and M. Hence, FIG. 22 supports the fact that the present technique provides a useful performance improvement for a significant number of instructions. On the other hand, as shown in FIG. 23 for a 256-bit wide data path processing vectors with 16 bit elements, in this case the percentage of instructions which use less than the full number of data elements is insignificant. The system designer can select the present technique whenever it is expected that there will be a significant number of instructions which do not fully utilize the vector size.

Figure 24:
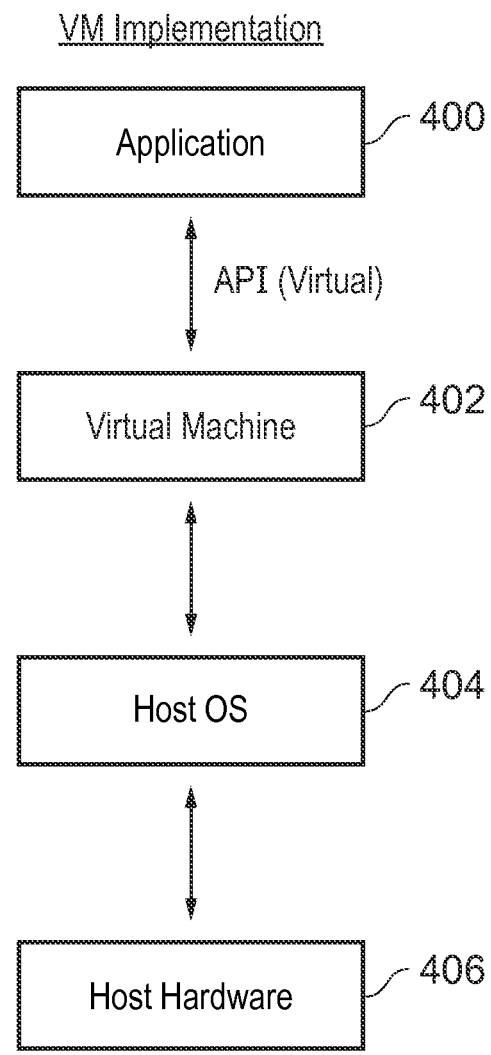
FIG. 24 shows a virtual machine implementation of the present technique.

FIG. 24 illustrates a virtual machine implementation that may be used. While the earlier described embodiments implement the present invention in terms of apparatus and methods for operating specific processing hardware supporting the techniques concerned, it is also possible to provide so-called virtual machine implementations of hardware devices. These virtual machine implementations run on a host processor 406 typically running a host operating system 404 supporting a virtual machine program 402. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 402 is capable of executing an application program (or operating system) 400 to give the same results as would be given by execution of the program by a real hardware device. Thus, the program instructions, including the control of memory accesses described above, may be executed from within the application program 400 using the virtual machine program 402.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments have been described in detail herein with reference to the accompanying drawings, it is to be understood that the claims are not limited to those precise embodiments, and that various changes and modifications can be effected therein by one skilled in the art without departing from the scope defined by the appended claims.

The invention claimed is:

1. A data processing apparatus comprising:
a vector register store configured to store vector operands comprising a plurality of data elements;
processing circuitry configured to process vector operands from the vector register store; and
control circuitry configured to control the processing circuitry to perform a vector scan operation on M data elements of a source vector operand V[0] to V[M−1] and at least one additional data element S, to generate M data elements of a result vector operand R[0] to R[M−1], where M is a power of 2, each data element of the source vector operand and the result vector operand comprises a plurality of bits, and for N≤M and 0≤i<N data element R[i] of the result vector operand has a value corresponding to a combination of the at least one additional data element S and at least some of data elements V[0] to V[i] of the source vector operand;
wherein the control circuitry is configured to control the processing circuitry to perform the vector scan operation in a plurality of steps, each step for generating a second vector from a first vector, where the first vector for a first step comprises data elements of the source vector operand, and the first vector for other steps comprises the second vector of the preceding step, each step comprising at least one combination operation for combining a data element of the first vector with the at least one additional data element S or another data element of the first vector to generate a data element of the second vector;

at least one of said plurality of steps comprises a plurality of combination operations performed in parallel; and
at least two of said plurality of steps comprise a combination operation for combining a data element of the first vector with the at least one additional data element S;
wherein at least in response to a vector scan operation for which N>G, where M/2≤G<M:
the control circuitry is configured to control the processing circuitry to perform said plurality of steps comprising at least one combination step for generating G data elements R[0] to R[G−1] of the result vector operand, and at least one further step for generating data elements R[G] to R[M−1] of said result vector operand when performed in addition to the at least one combination step;
said at least one combination step is such that, when said at least one combination step was performed by said processing circuitry without performing the at least one further step, then the processing circuitry would generate data elements [G] to [M−1] of the second vector in a final step of said at least one combination step, wherein for G≤k<M data element [k] of the second vector has a value corresponding to a combination of at least some of data elements V[0] to V[k] of the source vector operand, and
in said at least one further step, the control circuitry is configured to control the processing circuitry, for G≤k<N, to perform a combination operation for combining the at least one additional data element S with data element [k] of the first vector for the at least one further step.

2. The data processing apparatus according to claim 1, wherein in response to a vector scan operation for which M/2≤N≤G, the control circuitry is configured to control the processing circuitry to perform said at least one combination step and to omit said at least one further step.

3. The data processing apparatus according to claim 1, wherein the at least one further step comprises at least one combination operation for combining a data element of the first vector with the at least one additional data element S, and does not comprise any combination operations for combining a data element of the first vector with another data element of the first vector.

4. The data processing apparatus according to claim 1, wherein $M=2^P$ and said at least one combination step comprises P steps for generating data elements [0] to [M−1] of a second vector in response to data elements [0] to [M−1] of a first vector; and
for 0≤J<P, step J of said P steps comprises, for $2^J$≤m<N, a combination operation for combining data element [m] of said first vector with data element [m −$2^J$] of said first vector to generate data element [m] of said second vector.

5. The data processing apparatus according to claim 4, wherein M−G is a power of two, and for $\log_2(M-G)$≤J<P, step J of said P steps comprises, for $2^J$−(M−G)≤q<$2^J$, a combination operation for combining data element [q] of the first vector with said additional data element S to generate data element [q] of the second vector.

6. The data processing apparatus according to claim 1, wherein the control circuitry is configured to control the processing circuitry to output a carry value corresponding to data element R[N−1] of the result vector operand;
wherein when the at least one further step is omitted then the control circuitry is configured to control the processing circuitry to output the carry value earlier than when the at least one further step is performed by the processing circuitry.

7. The data processing apparatus according to claim 1, wherein the vector scan operation is associated with control information identifying which data elements of the source vector operand are selected data elements, and the control circuitry is configured to control the processing circuitry to process the selected data elements in the vector scan operation.

8. The data processing apparatus according to claim 7, wherein N has a value such that V[N−1] is the last selected data element of the source vector operand indicated by the control information.

9. The data processing apparatus according to claim 7, wherein the control circuitry is configured to control the processing circuitry to set data elements of the result vector operand corresponding to non-selected data elements of the source vector operand to one of:
(i) a predetermined value;
(ii) a value determined by performing the vector scan operation with non-selected data elements of the source vector operand set to a predetermined value;
(iii) a value of a corresponding data element in a source register for storing the source vector operand; and
(iv) a value of a corresponding data element in a destination register for storing the result vector operand.

10. The data processing apparatus according to claim 1, wherein the vector scan operation is associated with segment information identifying one or more segments of the source vector, each segment comprising one or more data elements;
wherein when the segment information identifies a plurality of segments, then the control circuitry is configured to control the processing circuitry to perform said vector scan operation on data elements of a first segment of said plurality of segments.

11. The data processing apparatus according to claim 10, where N has a value such that V[N−1] is the last selected data element of the first segment.

12. The data processing apparatus according to claim 10, wherein when the segment information identifies a plurality of segments, then the control circuitry is configured to control the processing circuitry to generate, for a further segment other than said first segment, at least one result data element within a corresponding further segment of said result vector operand, each result data element within the corresponding further segment having a value corresponding to a combination of one or more data elements of said further segment of the source vector operand.

13. The data processing apparatus according to claim 10, wherein
G=M−1, and when the segment information identifies a plurality of segments, then the control circuitry is configured to control the processing circuitry to omit said at least one further step of said vector scan operation.

14. The data processing apparatus according to claim 1, wherein the source vector operand comprises X data elements, where X≥M, and the result vector operand comprises Y data elements, where Y≥M.

15. The data processing apparatus according to claim 14, wherein the control circuitry is configured to control the processing circuitry to perform said vector scan operation on L data elements of the source vector operand to generate L data elements of the result vector operand, where L≤X, and L≤Y; and when L >M, then the L data elements of the result vector operand comprise L−M further data elements R[M] to R[L−1], wherein for M≤i<L result data element R[i] has a value corresponding to a combination of result data element R[M−1] and at least some of data elements V[M] to V[i] of the source vector operand.

16. The data processing apparatus according to claim 15, wherein when L>M, then N=M, and when L≤M, then N=L.

17. The data processing apparatus according to claim 14, wherein in each of the plurality of steps, the processing circuitry is configured to generate a maximum of M data elements of the second vector in parallel; and
when L>M, then the control circuitry is configured to control the processing circuitry to perform partitioned scan operations separately for a plurality of groups of data elements of the source vector operand, each group comprising M data elements or fewer.

18. The data processing apparatus according to claim 17, wherein when L>M, then the control circuitry is configured to control the processing circuitry to perform said partitioned scan operation for a first group of said plurality of groups with at least two of said plurality of steps comprising said combination operation for combining a data element of the first vector with the at least one additional data element S, and said plurality of steps comprising said at least one combination step and said at least one further step.

19. The data processing apparatus according to claim 18, wherein when L>M, then for at least one further group other than said first group, the control circuitry is configured to control the processing circuitry to perform said partitioned scan operation comprising:
at least one preliminary step comprising at least one combination operation for combining respective data elements of the further group of data elements; and
at least one additional step comprising at least one combination operation for combining a data element generated in said at least one preliminary step for said further group with a data element generated in said partitioned scan operation for said first group of data elements.

20. The data processing apparatus according to claim 19, wherein the control circuitry is configured to control the processing circuitry to perform said at least one preliminary step for said further group of data elements interleaved with said partitioned scan operation for said first group of data elements.

21. The data processing apparatus according to claim 1, wherein the at least one additional data element S comprises one of:
a scalar operand;
a data element of a vector operand;
a value determined using a plurality of data elements of a vector operand; and
a carry value determined by another vector operation.

22. A non-transitory, computer-readable storage medium storing a computer program which, when executed by a computer, controls the computer to provide a virtual execution environment according to the apparatus of claim 1.

23. A data processing apparatus comprising:
a vector register storage means for storing vector operands comprising a plurality of data elements;
processing means for processing vector operands from the vector register storage means; and
control means for controlling the processing means to perform a vector scan operation on M data elements of a source vector operand V[0] to V[M−1] and at least one additional data element S, to generate M data elements of a result vector operand R[0] to R[M−1], where M is a power of 2, each data element of the source vector operand and the result vector operand comprises a plurality of bits, and for N≤M and 0≤i<N data element R[i] of the result vector operand has a value corresponding to a combination of the at least one additional data element S and at least some of data elements V[0] to V[i] of the source vector operand;

wherein the control means is configured to control the processing means to perform the vector scan operation in a plurality of steps, each step for generating a second vector from a first vector, where the first vector for a first step comprises data elements of the source vector operand, and the first vector for other steps comprises the second vector of the preceding step, each step comprising at least one combination operation for combining a data element of the first vector with the at least one additional data element S or another data element of the first vector to generate a data element of the second vector;

at least one of said plurality of steps comprises a plurality of combination operations performed in parallel; and at least two of said plurality of steps comprise a combination operation for combining a data element of the first vector with the at least one additional data element S;

wherein at least in response to a vector scan operation for which N>G, where M/2≤G <M:

the control means is configured to control the processing means to perform said plurality of steps comprising at least one combination step for generating G data elements R[0] to R[G−1] of the result vector operand, and at least one further step for generating data elements R[G] to R[−1] of said result vector operand when performed in addition to the at least one combination step;

said at least one combination step is such that, when said at least one combination step was performed by said processing means without performing the at least one further step, then the processing circuitry would generate data elements [G] to [M−1] of the second vector in a final step of said at least one combination step, wherein for G≤k<M data element [k] of the second vector has a value corresponding to a combination of at least some of data elements V[0] to V[k] of the source vector operand, and in said at least one further step, the control means is configured to control the processing means, for G≤k<N, to perform a combination operation for combining the at least one additional data element S with data element [k] of the first vector for the at least one further step.

24. A data processing method for performing a vector scan operation on M data elements of a source vector operand V[0] to V[M−1] and at least one additional data element S, to generate M data elements of a result vector operand R[0] to R[M−1], where M is a power of 2, each data element of the source vector operand and the result vector operand comprises a plurality of bits, and for N≤M and 0≤i<N data element R[i] of the result vector operand has a value corresponding to a combination of the at least one additional data element S and at least some of data elements V[0] to V[i] of the source vector operand; the method performed using processing circuitry and comprising:

performing a plurality of steps for generating a second vector from a first vector, where the first vector for a first step comprises data elements of the source vector operand, and the first vector for other steps comprises the second vector of the preceding step, each step comprising at least one combination operation for combining a data element of the first vector with the at least one additional data element S or another data element of the first vector to generate a data element of the second vector;

wherein at least one of said plurality of steps comprises a plurality of combination operations performed in parallel; and at least two of said plurality of steps comprise a combination operation for combining a data element of the first vector with the at least one additional data element S;

wherein at least in response to a vector scan operation for which N>G, where M/2≤G <M:

said plurality of steps comprise at least one combination step for generating G data elements R[0] to R[G−1] of the result vector operand, and at least one further step for generating data elements R[G] to R[M−1] of said result vector operand when performed in addition to the at least one combination step;

said at least one combination step is such that, when said at least one combination step was performed without performing the at least one further step, then the processing circuitry would generate data elements [G] to [M−1] of the second vector in a final step of said at least one combination step, wherein for G≤k<M data element [k] of the second vector has a value corresponding to a combination of at least some of data elements V[0] to V[k] of the source vector operand, and in said at least one further step, the processing circuitry, for G≤k<N, performs a combination operation for combining the at least one additional data element S with data element [k] of the first vector for the at least one further step.

* * * * *